(12) United States Patent
Wimaladharma

(10) Patent No.: US 11,612,109 B1
(45) Date of Patent: Mar. 28, 2023

(54) MAGNETIC DEVICE AND METHOD FOR GROWING PLANTS

(71) Applicant: Welivitigoda Rajitha Danesha Wimaladharma, Colombo (LK)

(72) Inventor: Welivitigoda Rajitha Danesha Wimaladharma, Colombo (LK)

(*) Notice: Subject to any disclaimer, the term of this patent is extended or adjusted under 35 U.S.C. 154(b) by 0 days.

(21) Appl. No.: 17/679,711

(22) Filed: Feb. 24, 2022

(51) Int. Cl.
*A01G 7/04* (2006.01)

(52) U.S. Cl.
CPC .................................. *A01G 7/04* (2013.01)

(58) Field of Classification Search
CPC ........................................................ A01G 7/04
USPC ............................................................ 47/1.3
See application file for complete search history.

(56) References Cited

U.S. PATENT DOCUMENTS

| | | | |
|---|---|---|---|
| 4,785,575 A | 11/1988 | Shioi | |
| 5,012,110 A * | 4/1991 | Kropp | A01G 7/04 148/108 |
| 5,077,934 A | 1/1992 | Liboff et al. | |
| 5,464,456 A | 11/1995 | Kertz | |
| 5,819,467 A | 10/1998 | Zucker | |
| 6,023,880 A * | 2/2000 | Levengood | A01H 3/00 47/1.3 |
| 7,648,498 B2 | 1/2010 | Hempel | |
| 7,791,441 B1 * | 9/2010 | Jefferson | H01F 7/021 366/273 |
| 8,919,035 B2 * | 12/2014 | Schmidt | A01G 7/04 47/1.3 |
| 2014/0235925 A1 * | 8/2014 | Paz | A01G 7/04 47/1.01 R |
| 2015/0189839 A1 | 7/2015 | Matsui | |
| 2020/0282228 A1 * | 9/2020 | Bode | H01F 7/20 |
| 2022/0117176 A1 * | 4/2022 | Gennaro | A01G 27/008 |

FOREIGN PATENT DOCUMENTS

| | | | | |
|---|---|---|---|---|
| CA | 2631215 A1 * | 6/2007 | | A61N 2/06 |
| CA | 2829640 A1 * | 3/2014 | | A01G 1/001 |
| CN | 103943303 A | 7/2014 | | |
| DE | 4036648 A1 * | 5/1991 | | |
| DE | 9102416 U1 | 5/1991 | | |
| GB | 2189673 A * | 11/1987 | | A01C 1/00 |

(Continued)

OTHER PUBLICATIONS

Karol Fijalkowski et al., "Modification of bacterial cellulose through exposure to the rotating magnetic field," Carbohydrate Polymers 133 (2015) 52-60 (Year: 2015).*

(Continued)

*Primary Examiner* — Magdalena Topolski
(74) *Attorney, Agent, or Firm* — Egbert, McDaniel & Swartz, PLLC

(57) ABSTRACT

A magnetic device for growing plants has a body, a set of magnetic elements and an actuation mechanism. The body has a space enclosing a base of the plants and allowing the plants to grow out of the space along a vertical axis. The magnetic elements are coupled to the body and surround the space so as to generate an axial magnetic field in the space. The actuation mechanism is coupled to the body so as to rotate the magnetic elements around the space and about the vertical axis. The base of the plants exposed to the rotating magnetic field to enhance growth of the plants.

19 Claims, 25 Drawing Sheets
(23 of 25 Drawing Sheet(s) Filed in Color)

(56) References Cited

FOREIGN PATENT DOCUMENTS

| | | | |
|---|---|---|---|
| JP | H03206820 A | 9/1991 |
| JP | H0726918 Y2 | 6/1995 |
| JP | H09121682 A | 5/1997 |
| JP | H10313685 A | 12/1998 |
| JP | 2004248519 A | 9/2004 |
| KR | 200434760 Y1 | 12/2006 |
| KR | 100986213 B1 | 10/2010 |
| KR | 20110013302 A | 2/2011 |
| KR | 102012408 B1 | 10/2019 |
| WO | 1999035897 A1 | 7/1999 |
| WO | 2021030161 A1 | 2/2021 |

OTHER PUBLICATIONS

Hossack, et al., "Seed Germination and Their Photon Emission Profile Following Exposure to a Rotating Magnetic Field", Open Journal of Biophysics, Aug. 27, 2019, pp. 254-266.

Upadyshev, et al., "The effect of a magnetic field on the phenolic composition and virus sanitation of raspberry plants", Horticultural Science (Prague), Apr. 7, 2021, pp. 166-173.

Galland et al., "Megnetoreception in plant", Journal of Plant Research, Nov. 9, 2005.

Fijałkowski et al., "Time Dependent Influence of Rotating Magnetic Field on Bacterial Cellulose", International Journal of Polymer Science, Dec. 21, 2015.

Tessaro et al., "Bacterial growth rates are influenced by cellular characteristics of individual species when immersed in electromagnetic fields", Microbiological Research 172 (2015), Jan. 19, 2015, pp. 26-33.

\* cited by examiner

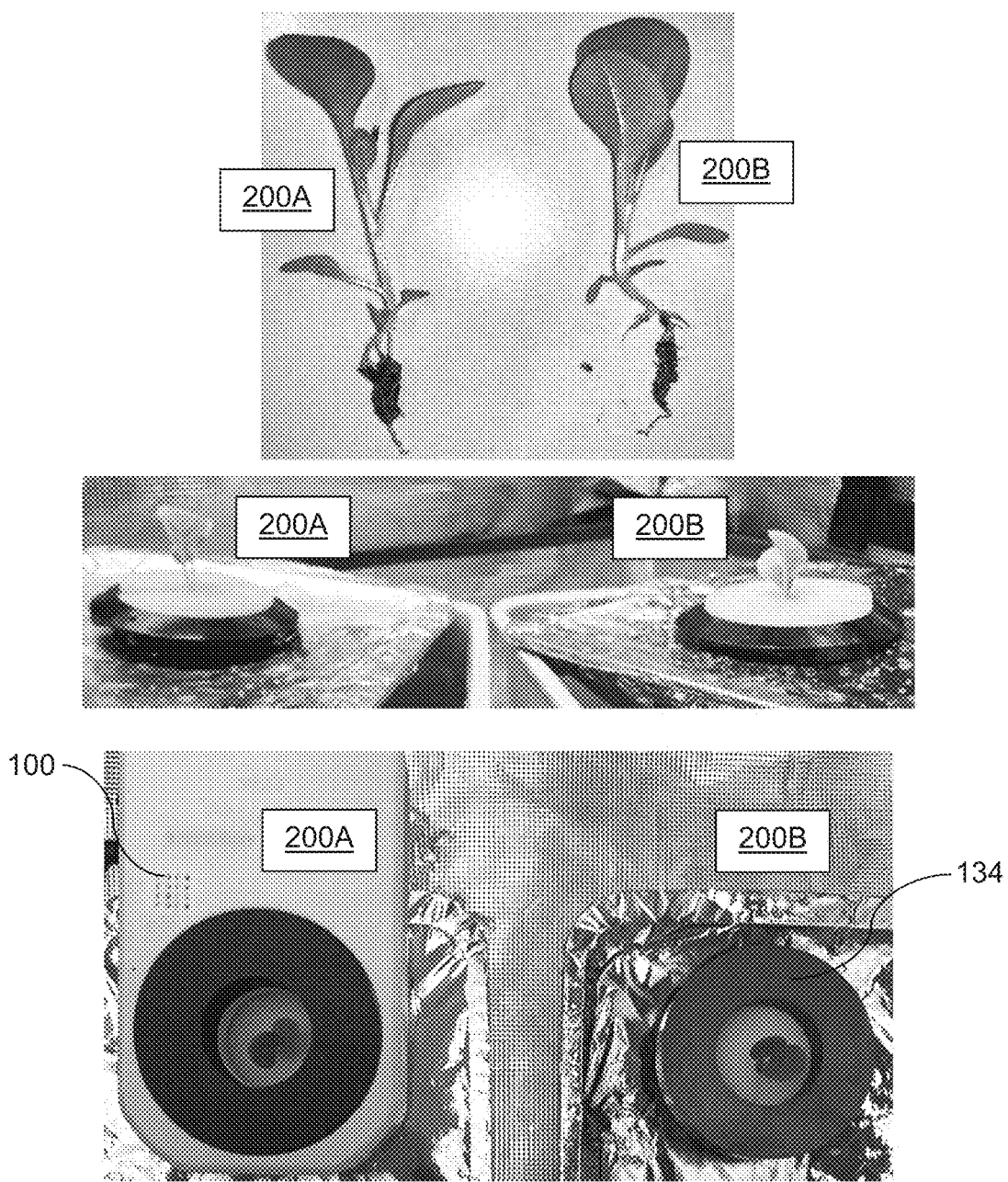
Fig. 2A (Tobacco Day 7)

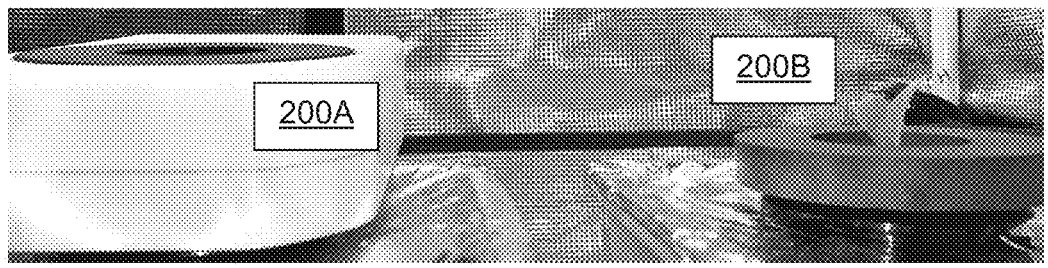
Fig. 2B (Tobacco Day 8)
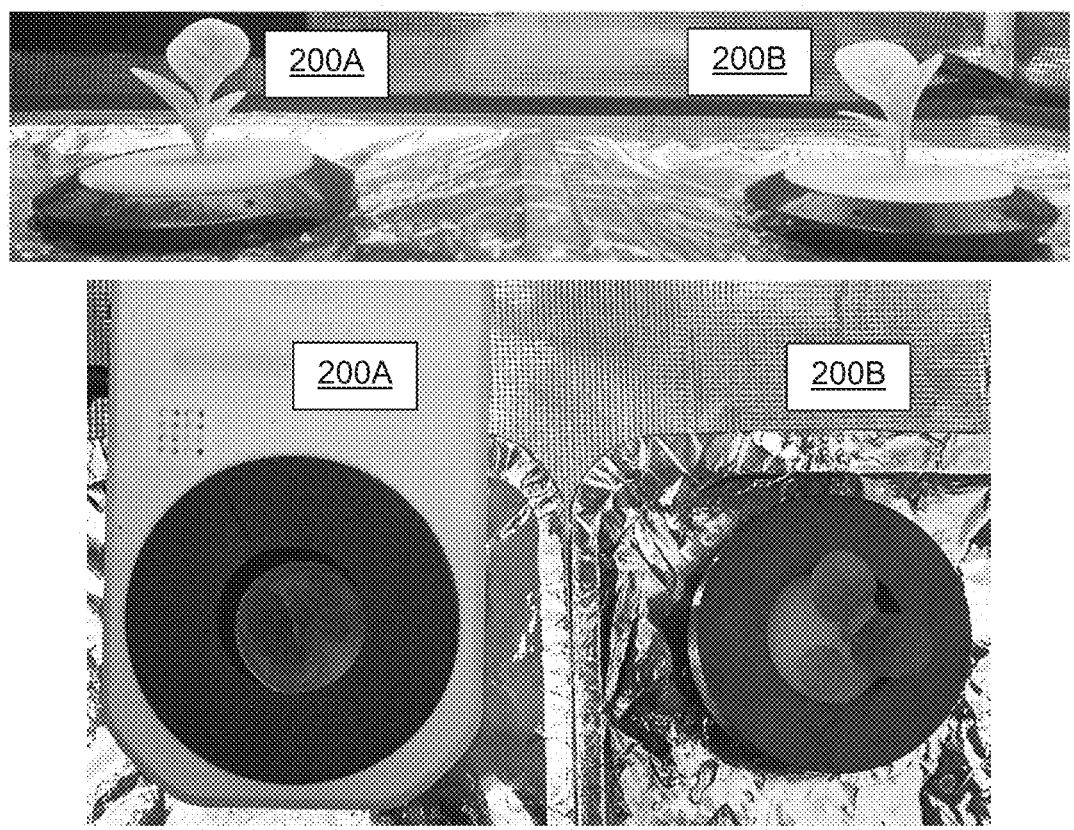
Fig. 2C (Tobacco Day 14)

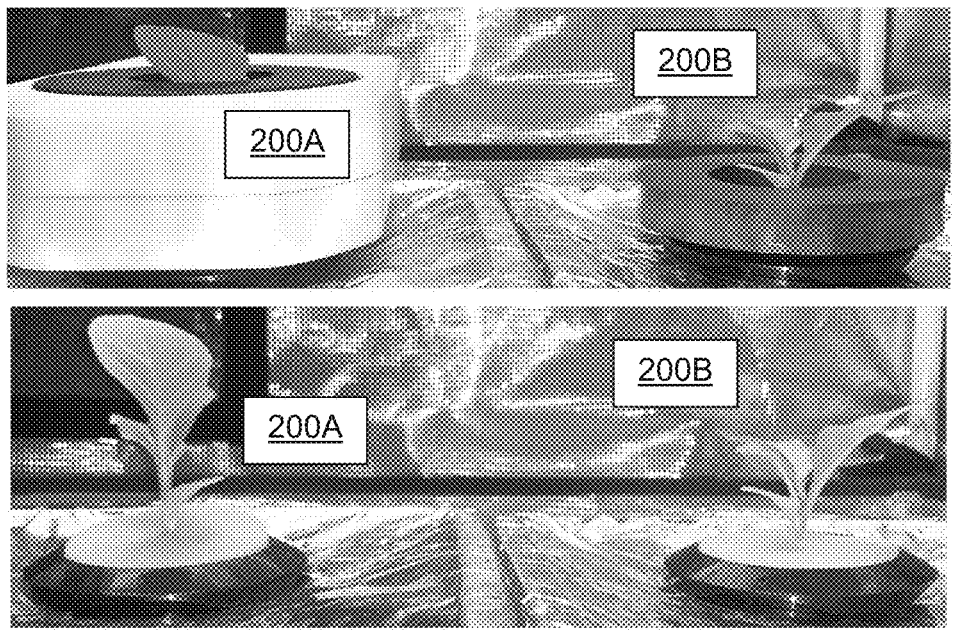
Fig. 2D (Tobacco Day 18)
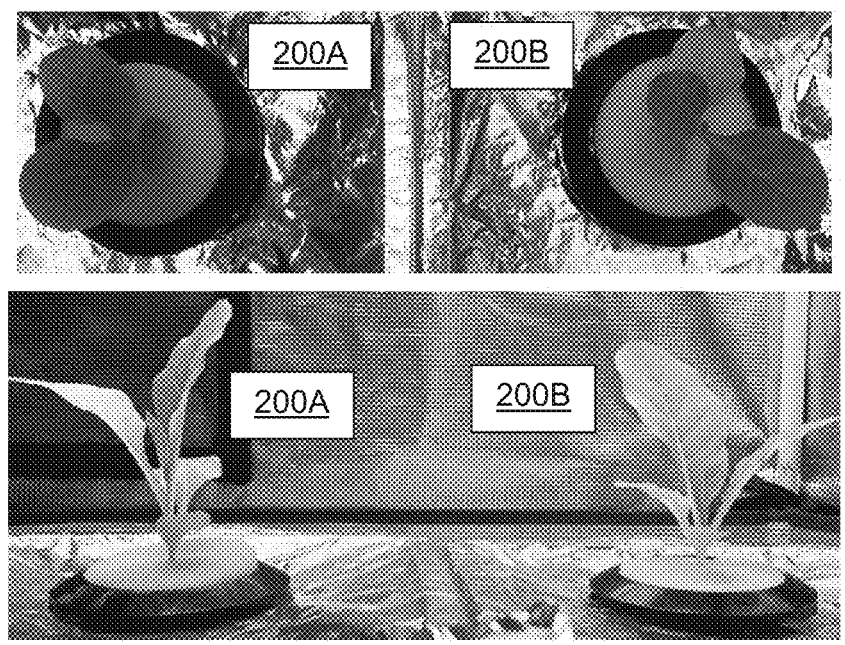
Fig. 2E (Tobacco Day 20)

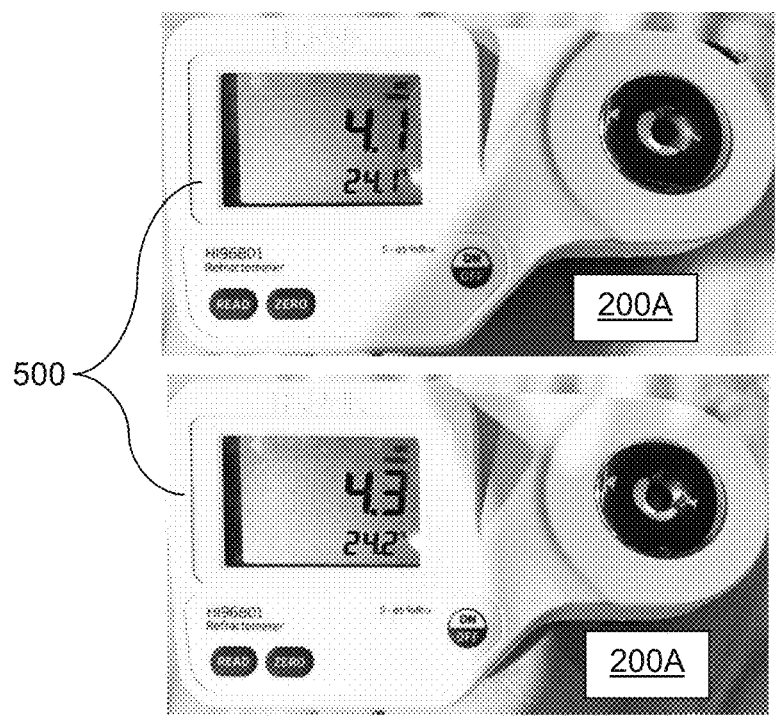
Fig. 2F (Tobacco Day 20)
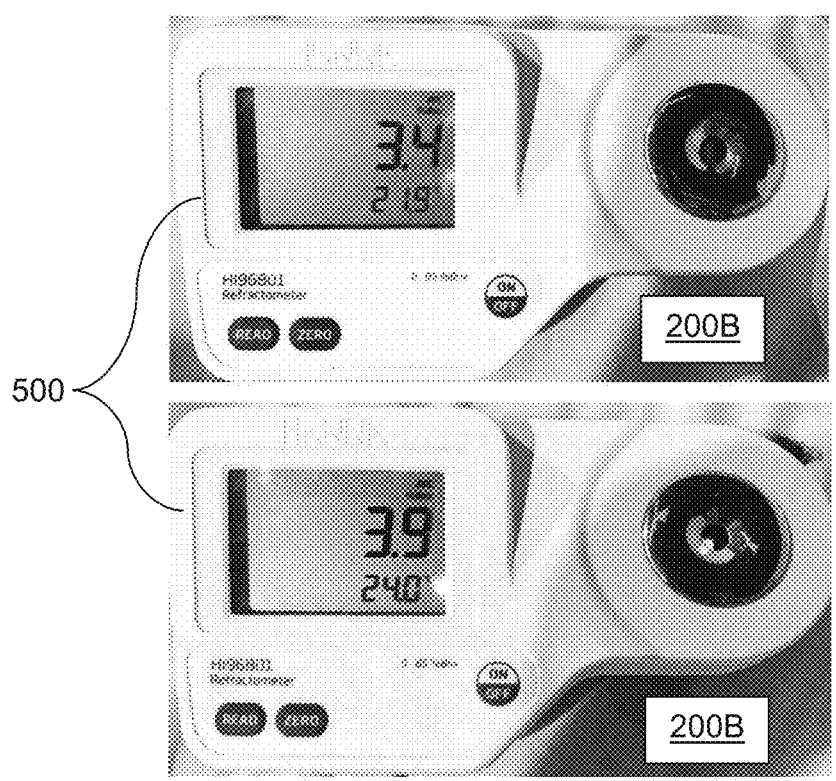
Fig. 2G (Tobacco Day 20)

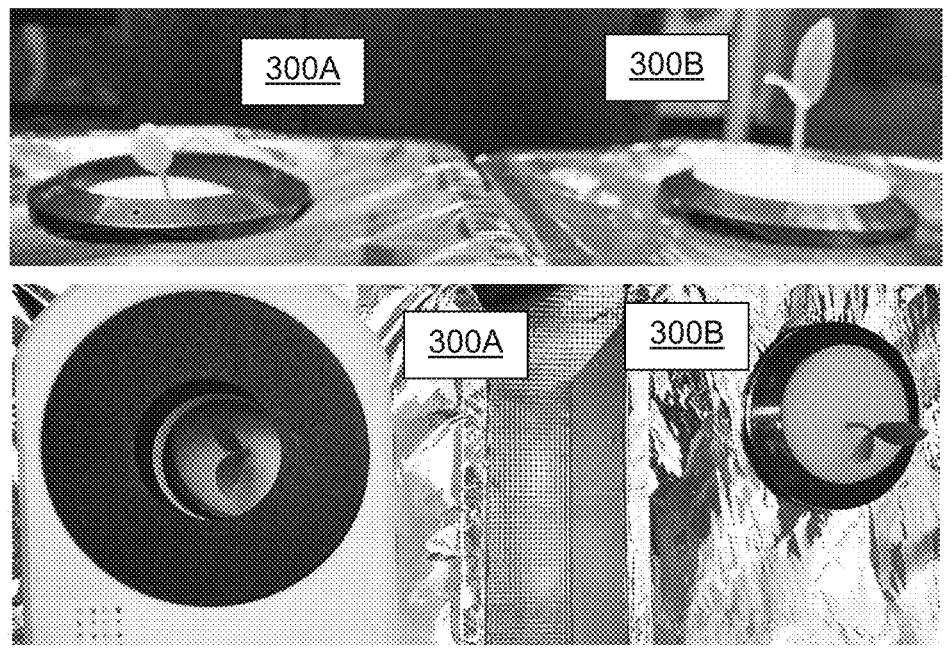
Fig. 3A (Spinach Day 5)
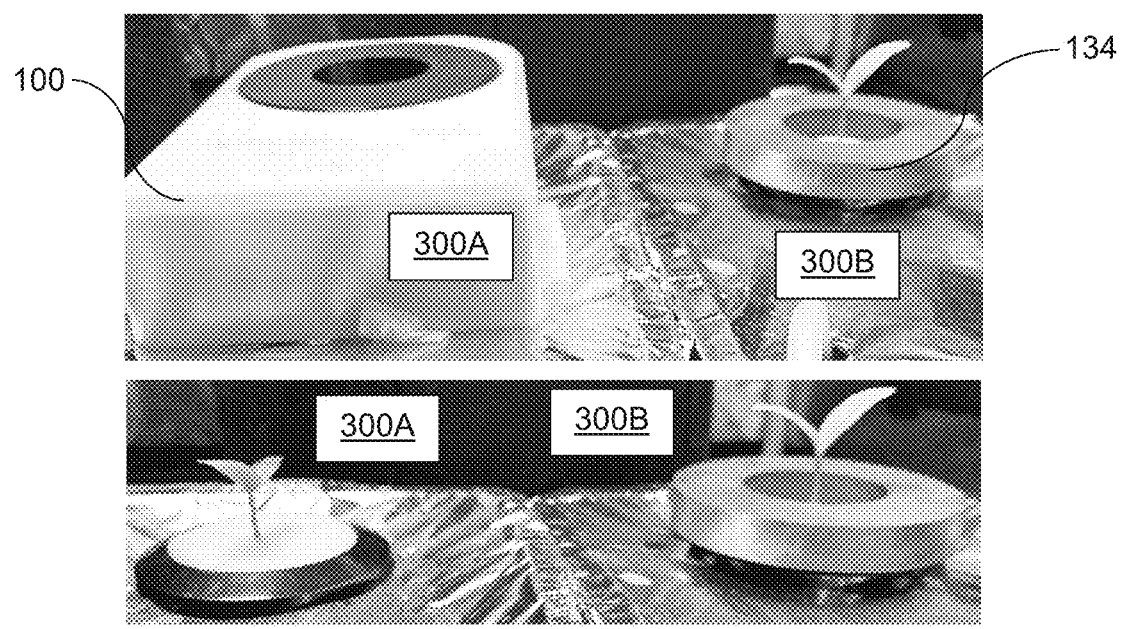
Fig. 3B (Spinach Day 7)

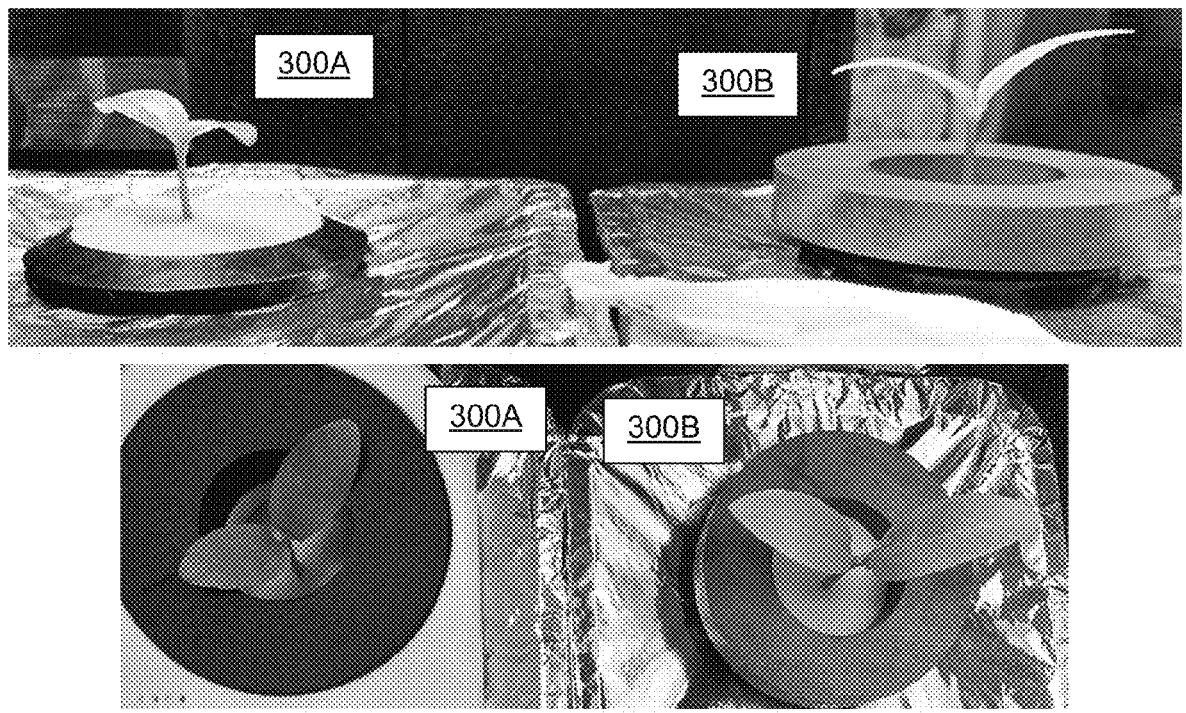
Figure 3C (Spinach Day 9)
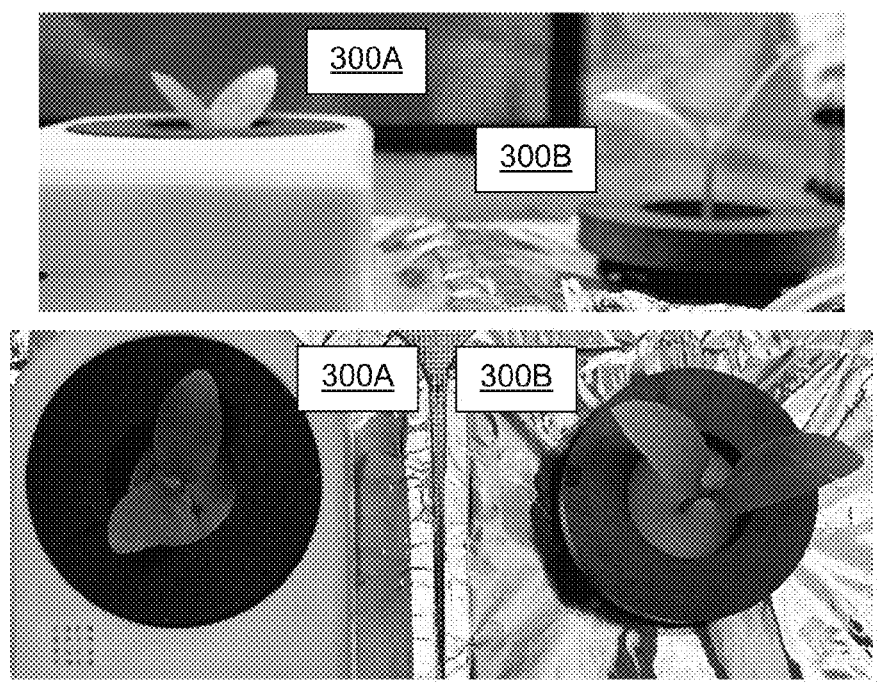
Fig. 3D (Spinach Day 12)

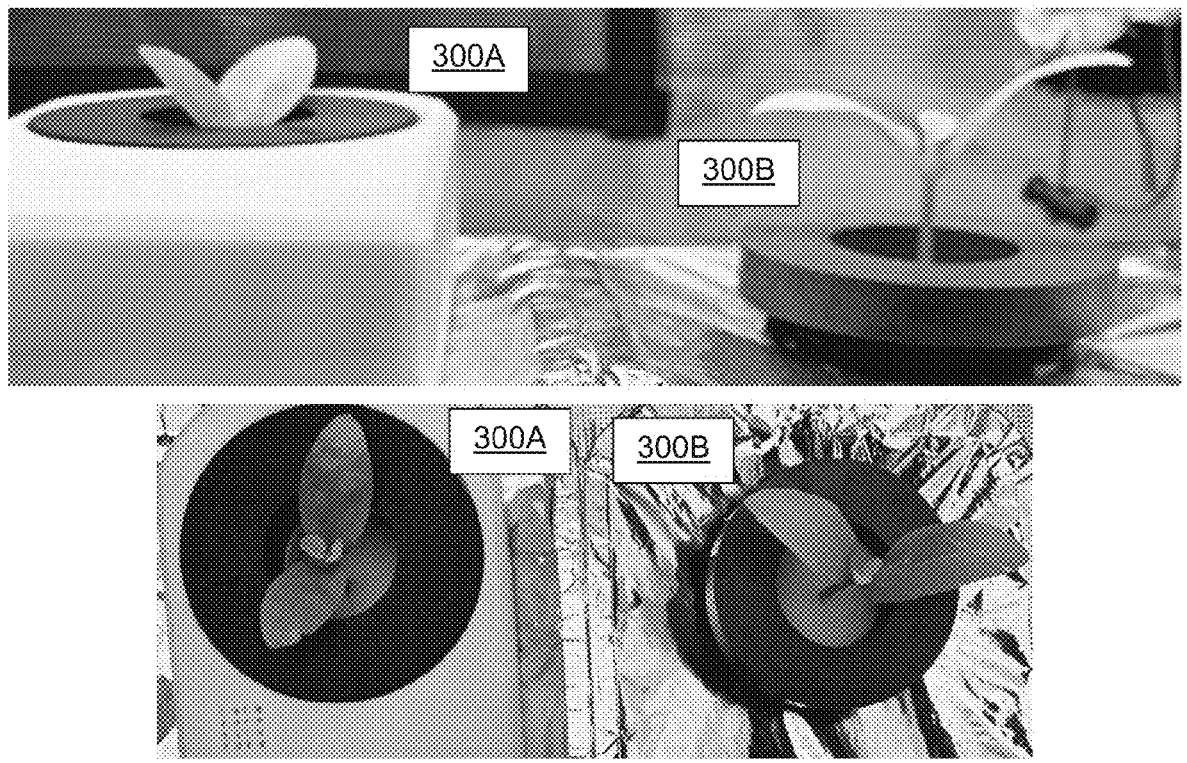
Fig. 3E (Spinach Day 15)
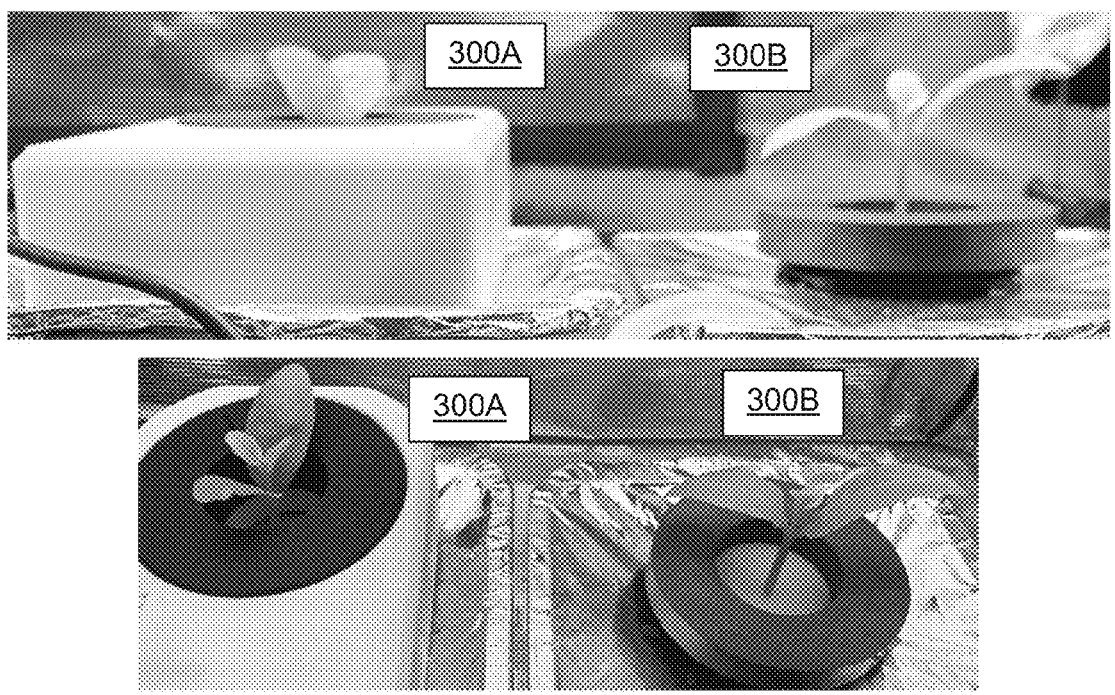
Fig. 3F (Spinach Day 18)

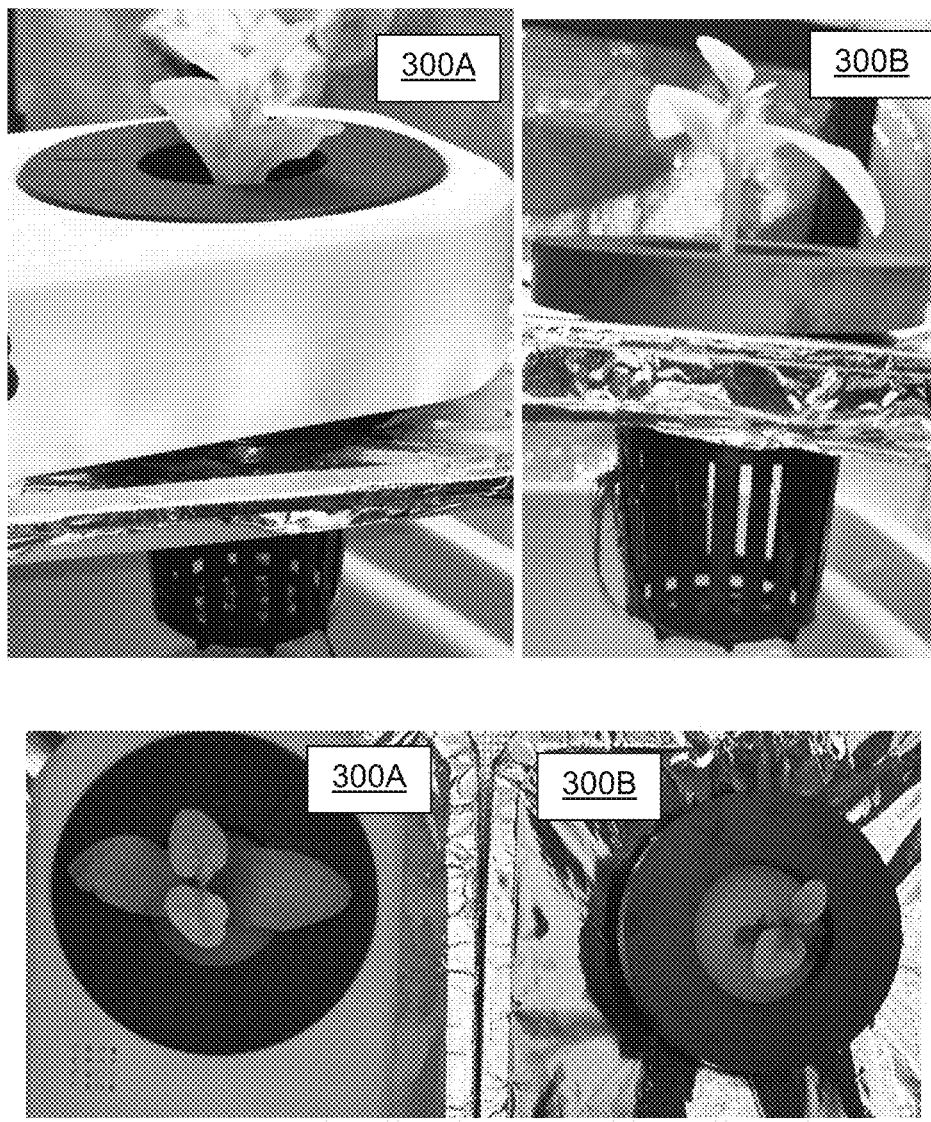
Fig. 3G (Spinach Day 24)

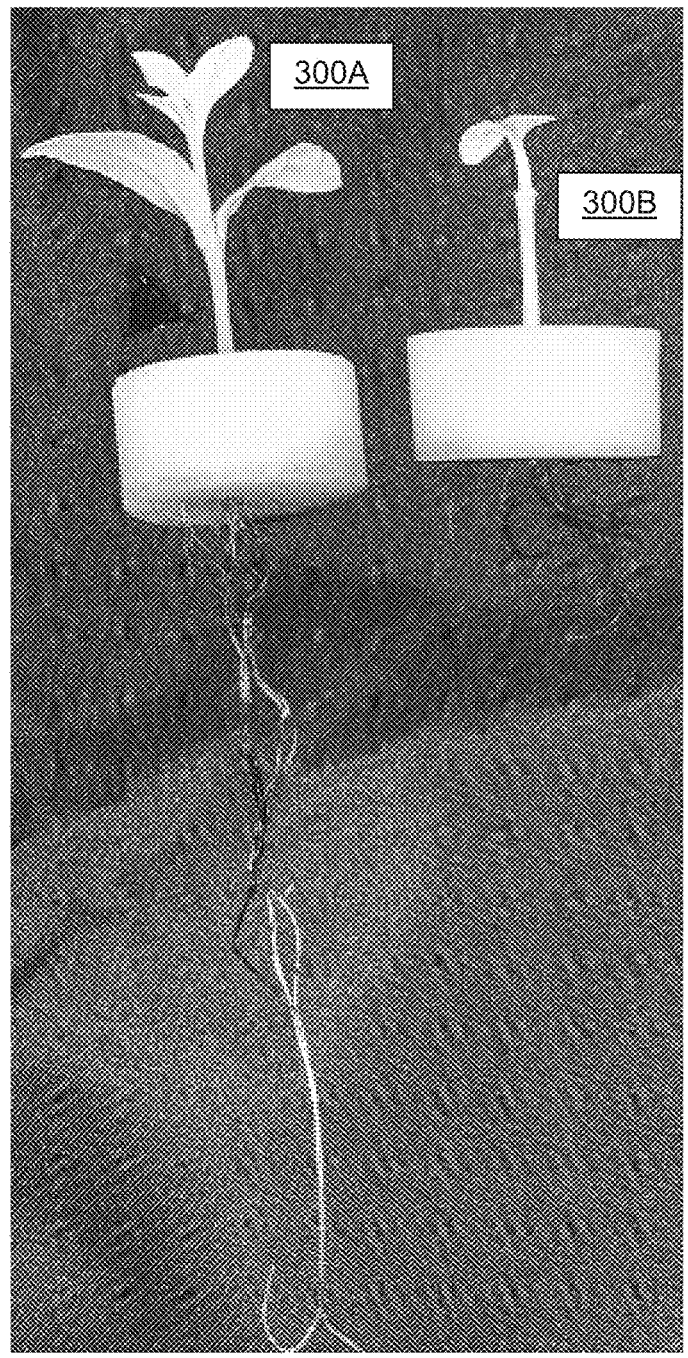
Fig. 3H (Spinach Day 24)

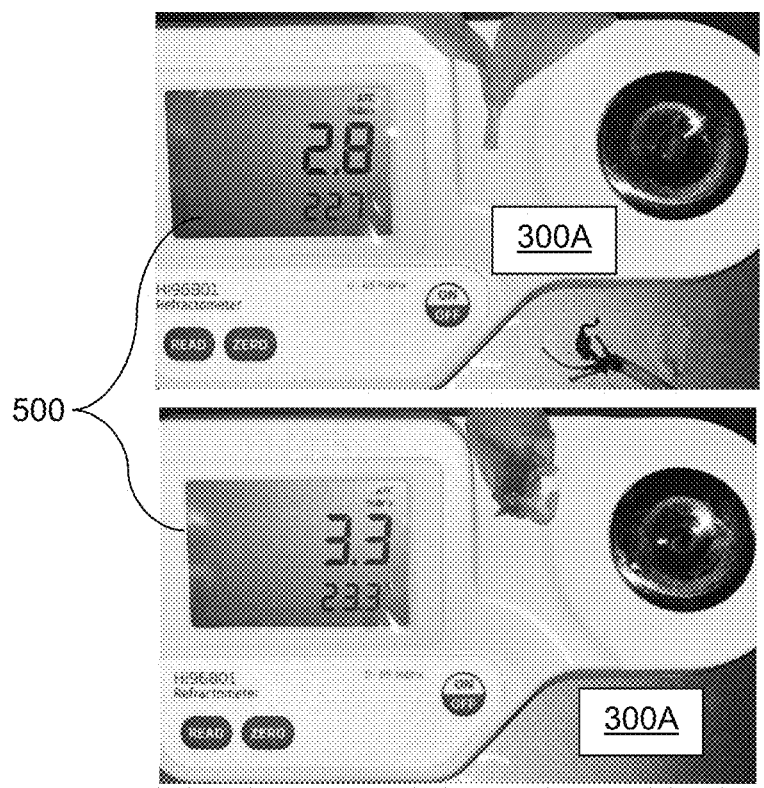
Fig. 3I (Spinach Day 24)
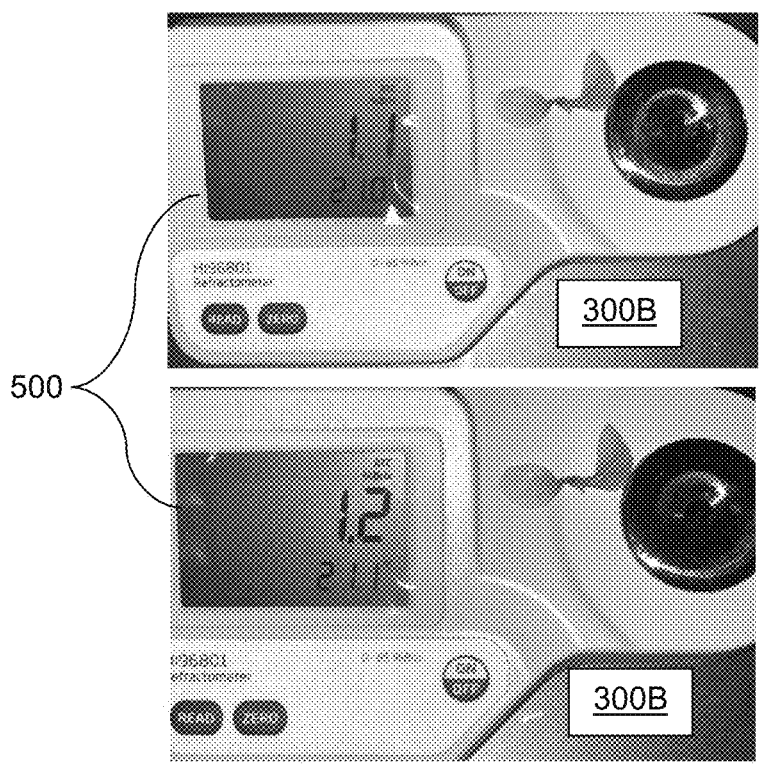
Fig. 3J (Spinach Day 24)

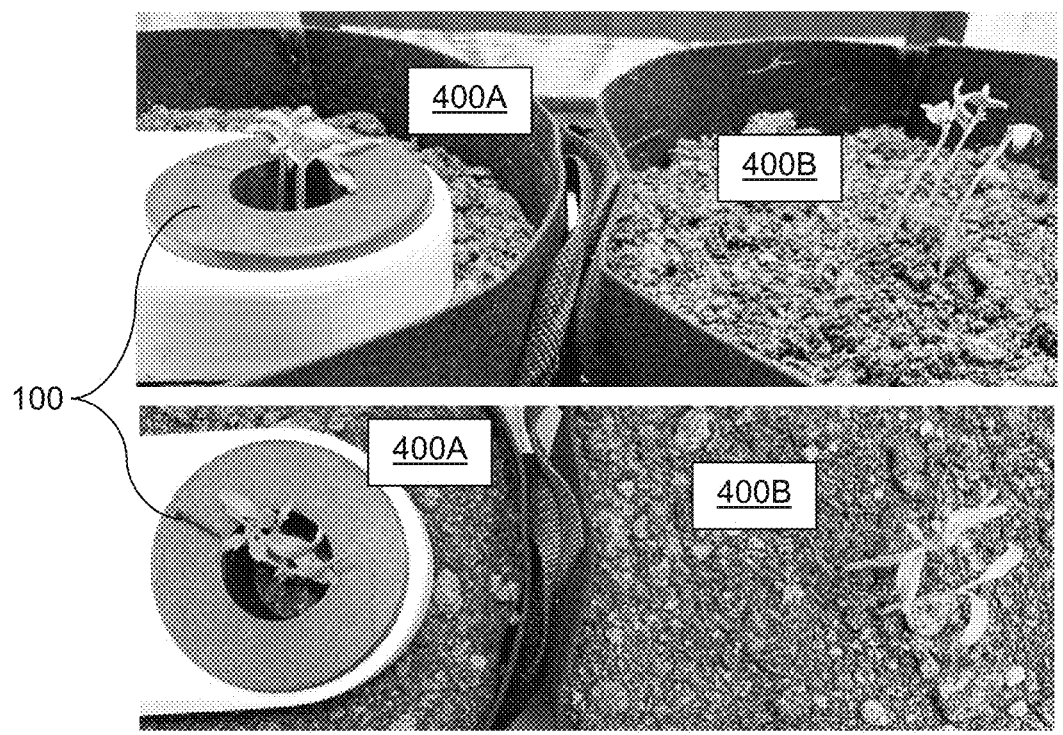
Fig. 4A (Tomato Day 1)
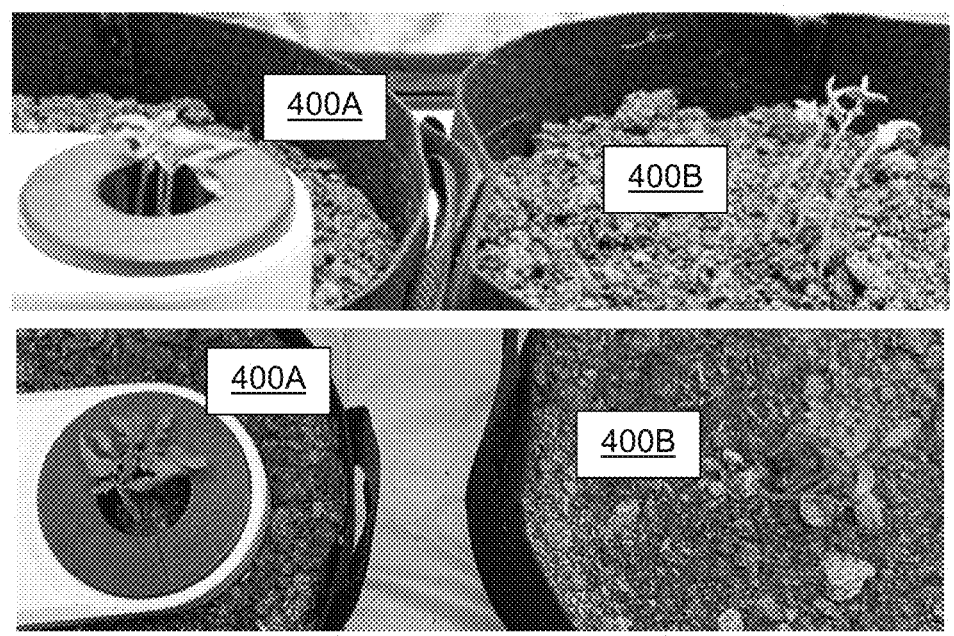
Fig. 4B (Tomato Day 2)

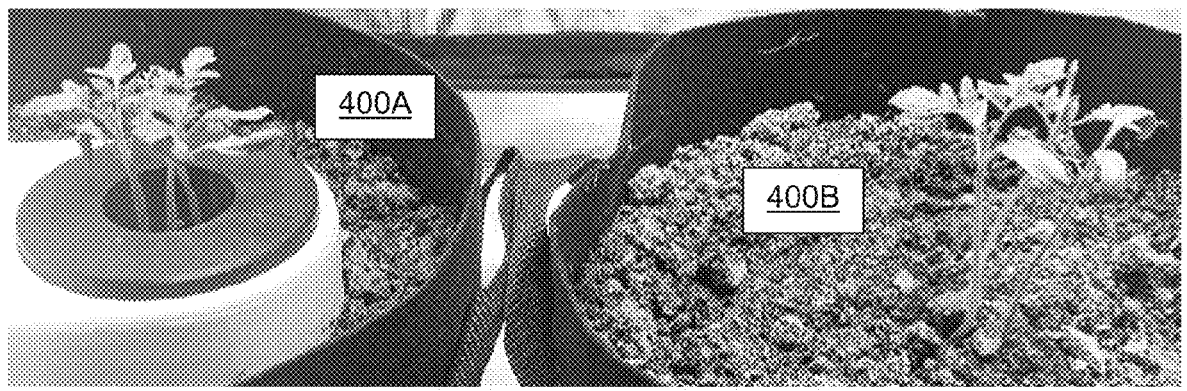
Fig. 4C (Tomato Day 4)
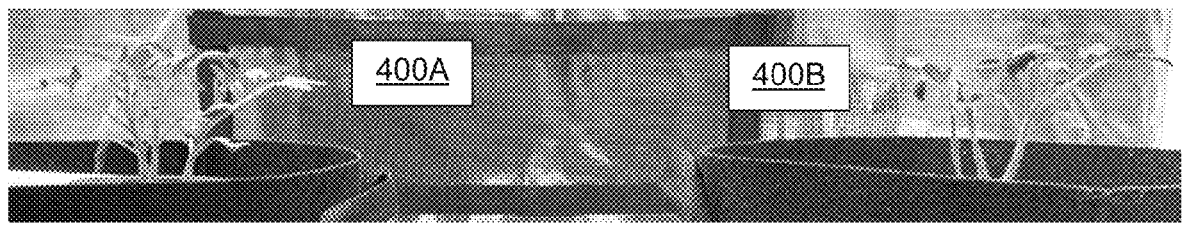
Fig. 4D (Tomato Day 8)
Fig. 4E (Tomato Day 12)

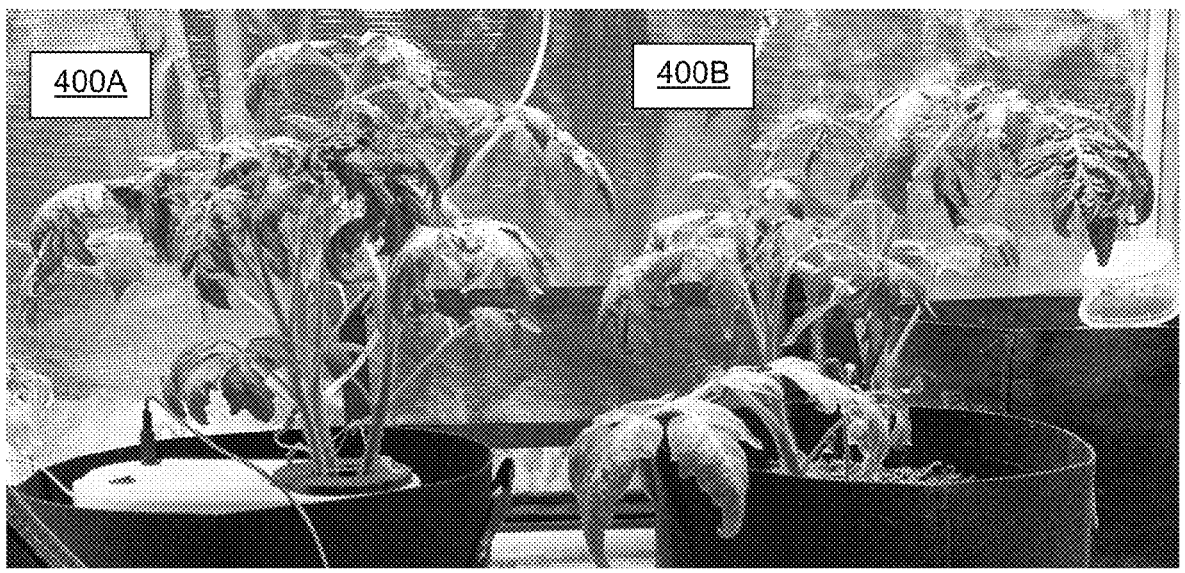
Fig. 4F (Tomato Day 13)
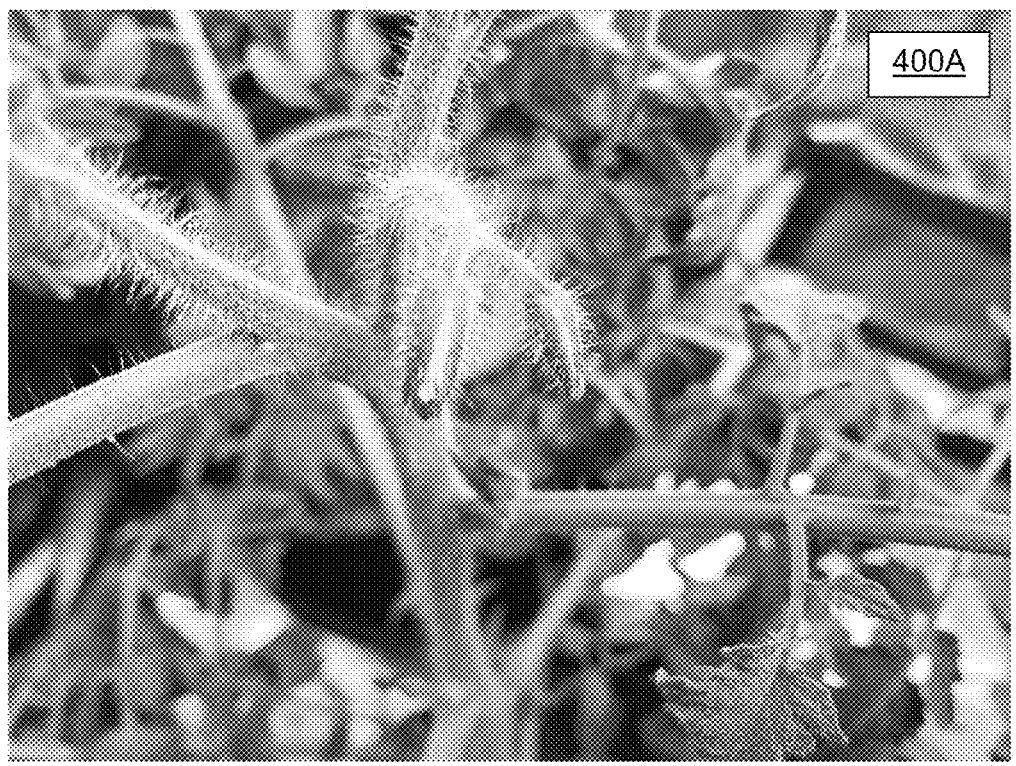
Fig. 4G (Tomato Day 33)

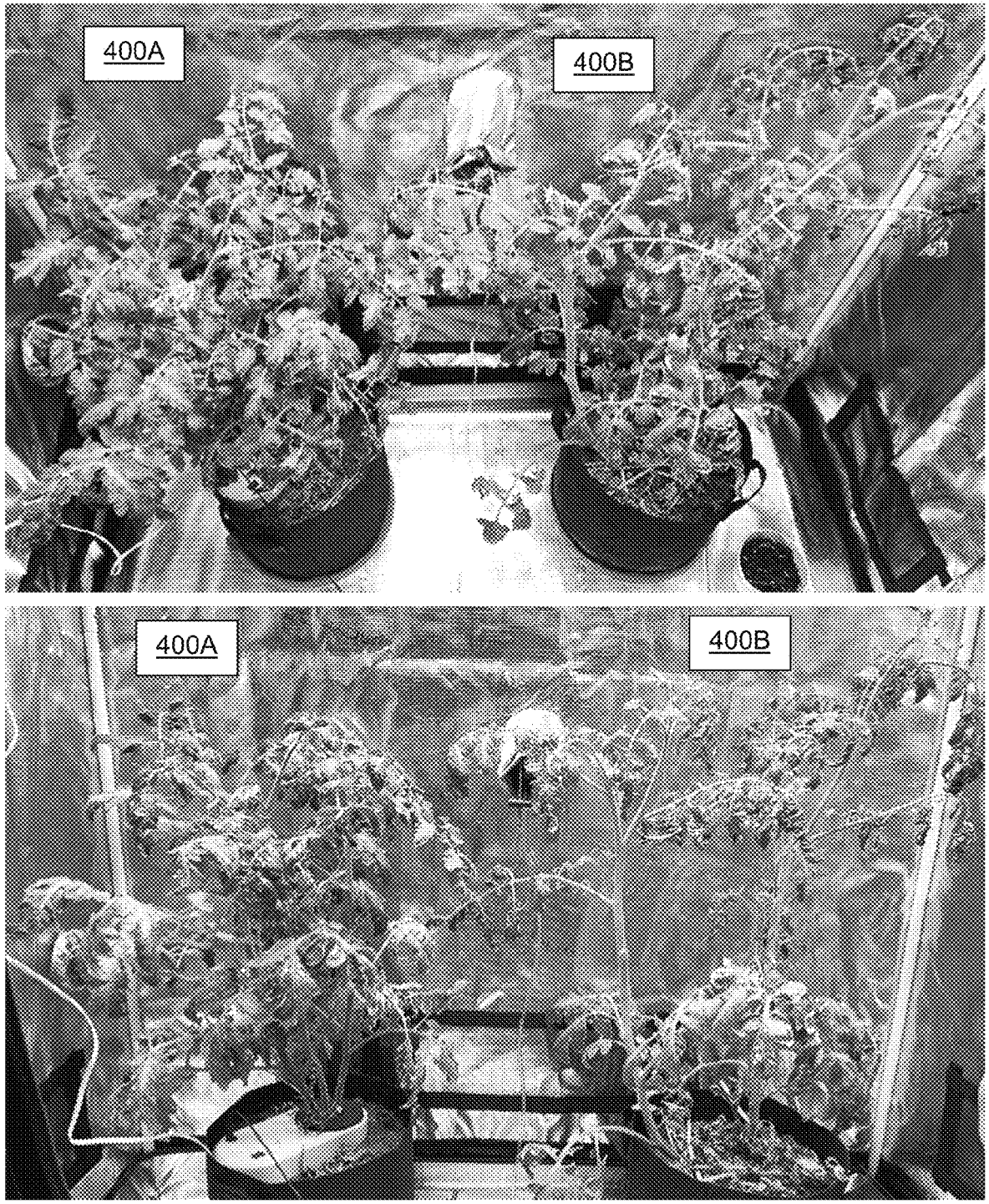
Fig. 4H (Tomato Day 43)

Fig. 4I (Tomato Day 50)

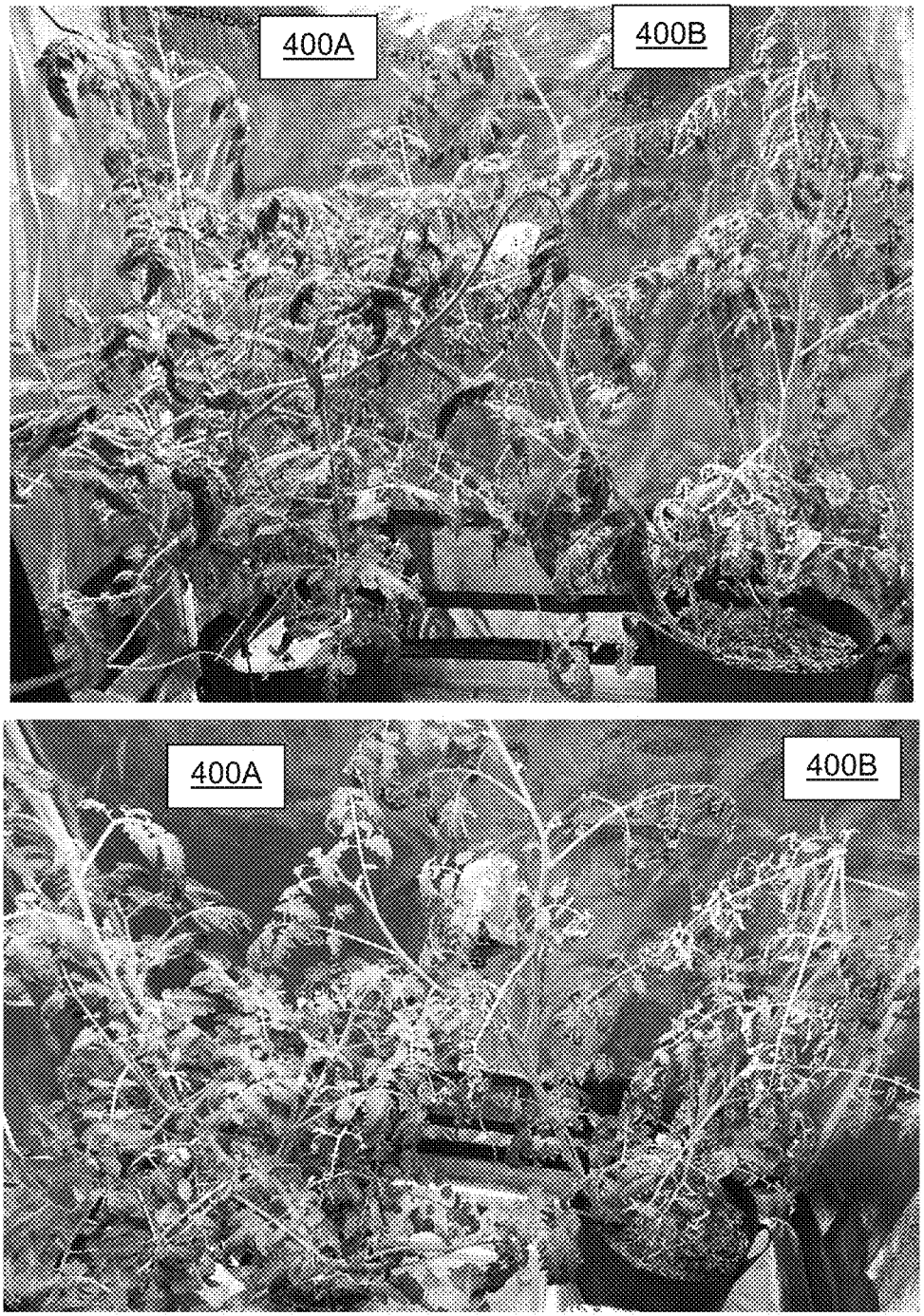
Fig. 4J (Tomato Day 61)

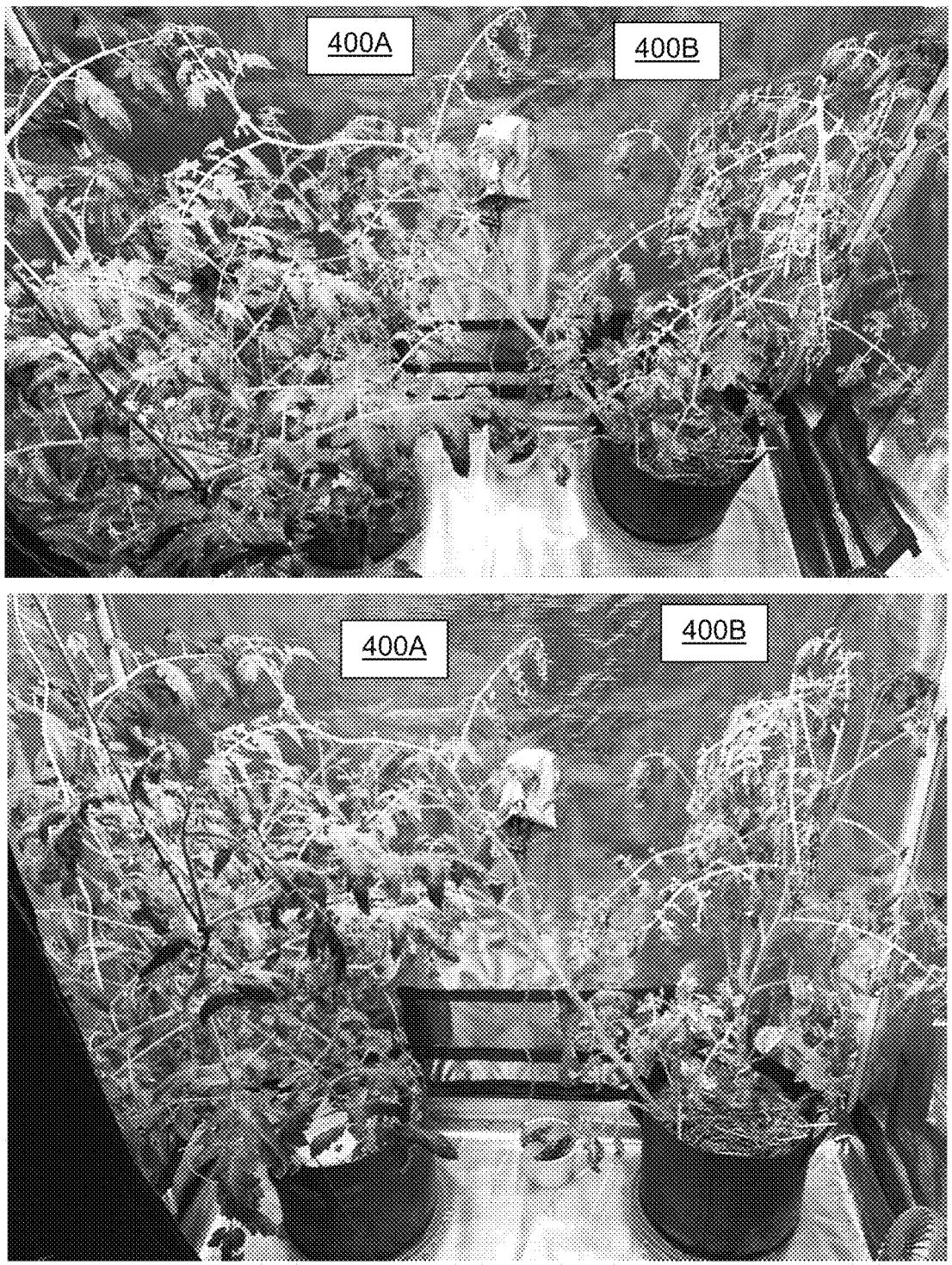
Fig. 4K (Tomato Day 67)

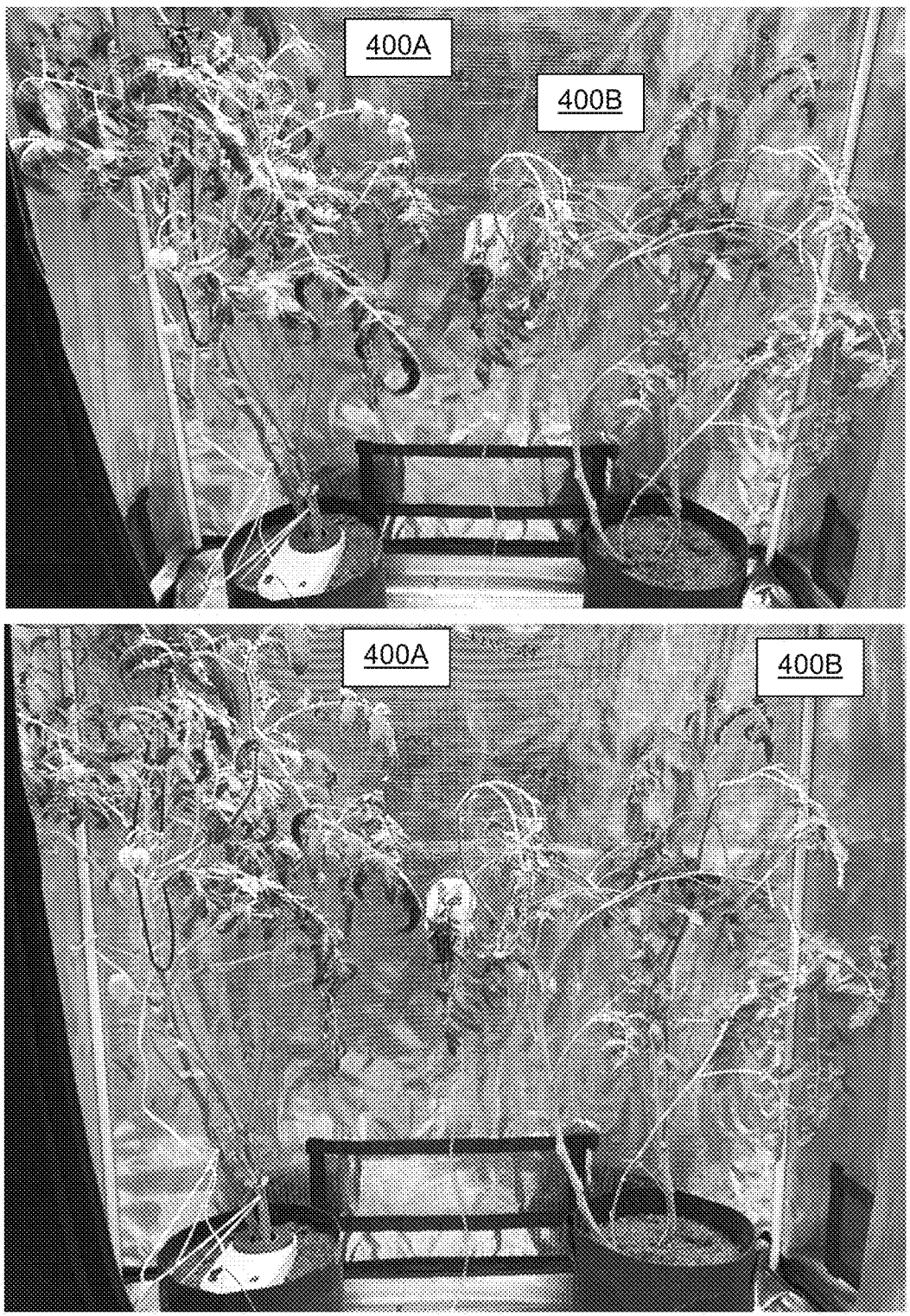
Fig. 4L (Tomato Day 79)

Fig. 4M (Tomato Day 92)

Fig. 4N (Tomato Day 112)

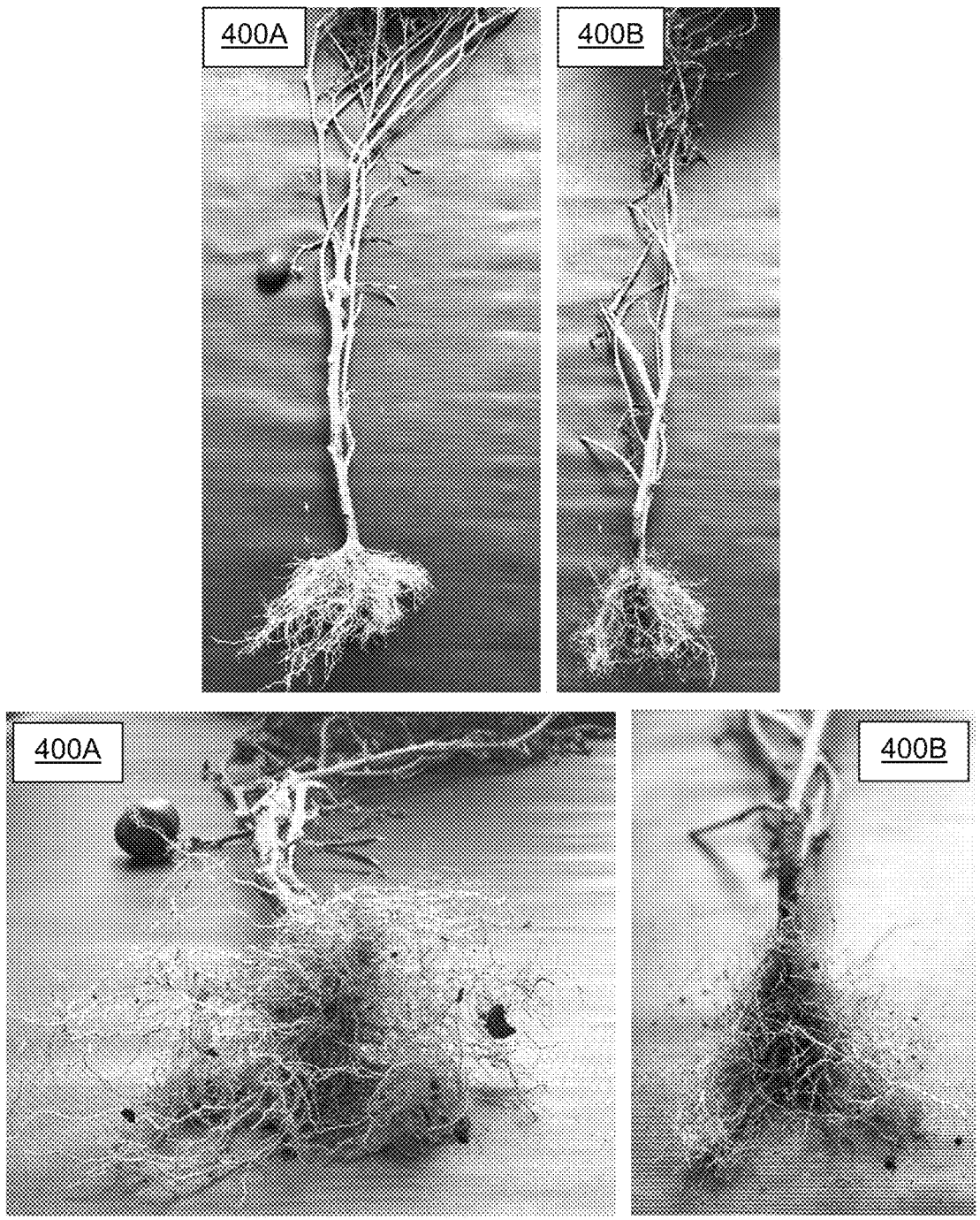
Fig. 4O (Tomato Day 112)

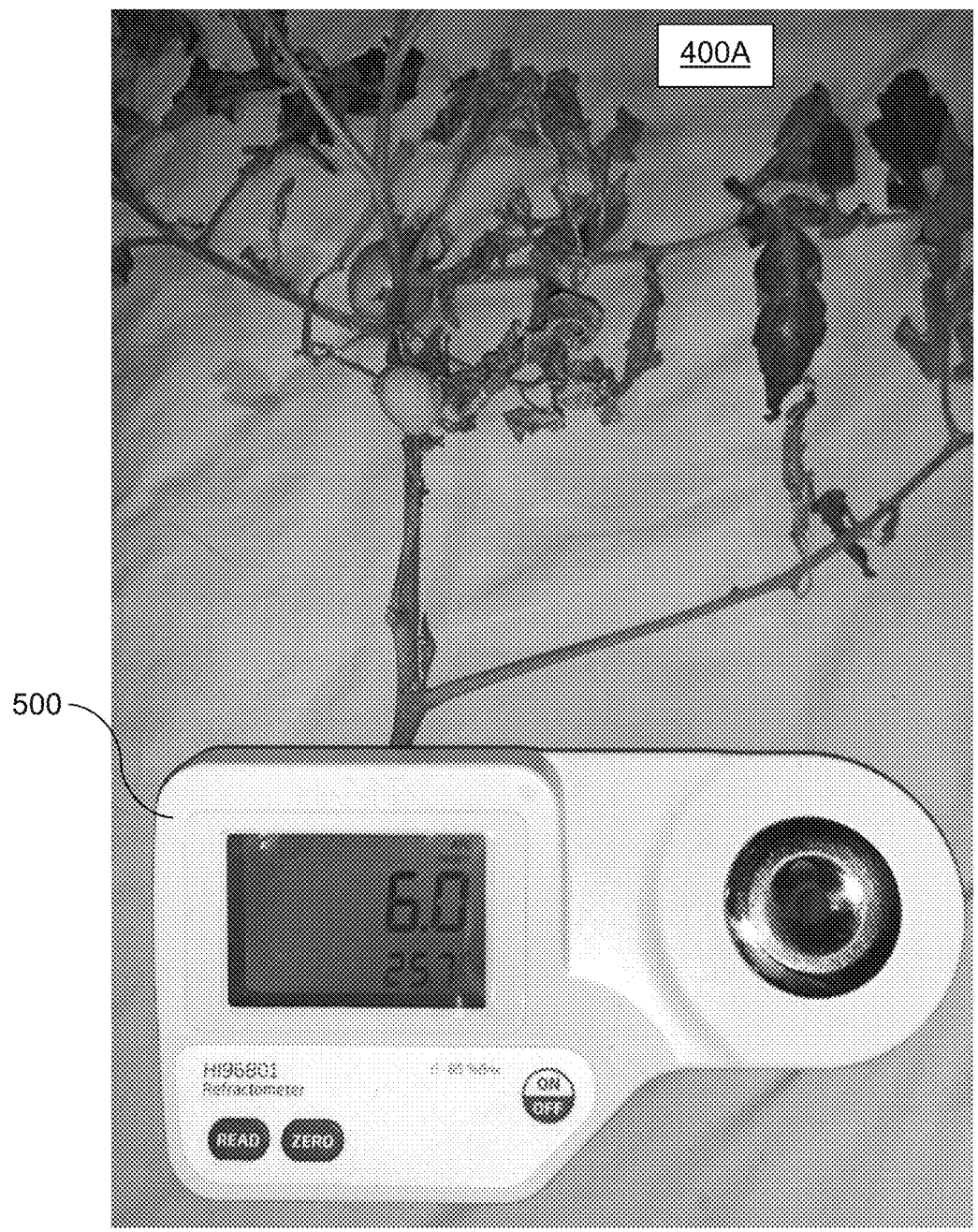
Fig. 4P (Tomato Day 112)

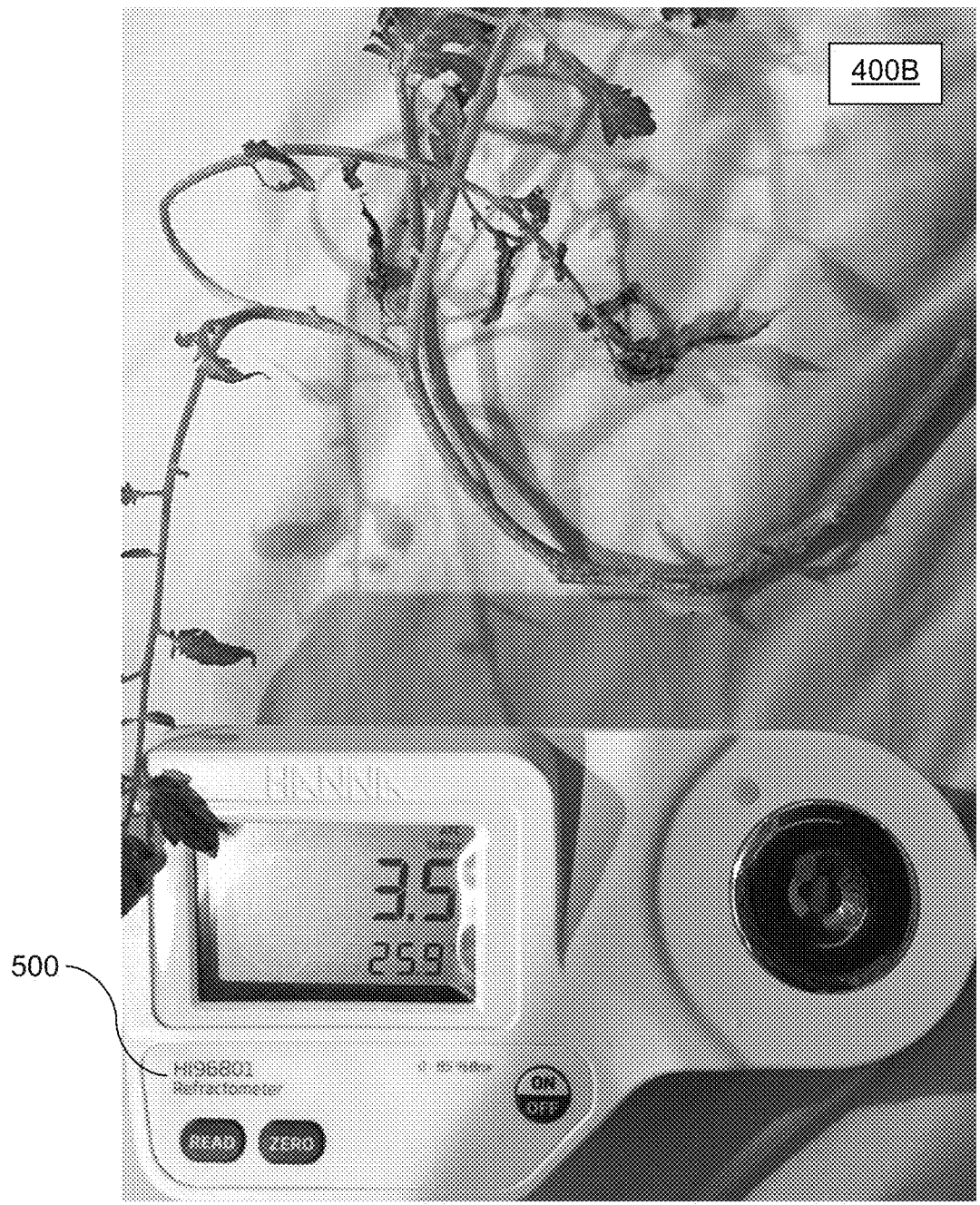
Fig. 4Q (Tomato Day 112)

MAGNETIC DEVICE AND METHOD FOR GROWING PLANTS

CROSS-REFERENCE TO RELATED APPLICATIONS

Not applicable.

FIELD OF INVENTION

The present disclosure generally relates to a magnetic device and a method for growing plants.

BACKGROUND OF THE INVENTION

The world's human population is projected to grow by at least 20% by 2050 but some studies have shown that food demand needs to increase by some 70% to feed the world's population in 2050. Various agricultural technologies and innovations have been developed to increase crop production and improve crop quality. Some studies have shown that magnetic fields have positive effects on crop or plant growth. For example, WO 2021030161 describes electromagnetic treatment of plants to improve plant growth and reduce plant pests. Given the increasing food demand in the future, there is a need to provide an improved device and method for growing plants.

BRIEF SUMMARY OF THE INVENTION

According to a first aspect of the present disclosure, there is a magnetic device for growing plants. The magnetic device comprises: a body comprising a space for enclosing a base of the plants and growing the plants axially out of the space; a set of magnetic elements coupled to the body and surrounding the space, the magnetic elements configured for generating an axial magnetic field in the space; and an actuation mechanism coupled to the body and configured for rotating the magnetic elements around the space, thereby rotating the axial magnetic field around the space. In use, the base of the plants is exposed to the rotating axial magnetic field to thereby enhance growth of the plants.

According to a second aspect of the present disclosure, there is a method for growing plants. The method comprises: enclosing a base of the plants within a space of a device body; growing the plants axially out of the space; generating an axial magnetic field in the space by a set of magnetic elements coupled to the body and surrounding the space; rotating the magnetic elements around the space to thereby rotate the axial magnetic field around the space; and exposing the base of the plants to the rotating axial magnetic field to thereby enhance growth of the plants.

A magnetic device and method for growing plants according to the present disclosure are thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIGS. 2A to 2G are illustrations of an experiment on growing tobacco plants using the magnetic device.

FIGS. 3A to 3J are illustrations of an experiment on growing spinach plants using the magnetic device.

FIGS. 4A to 4Q are illustrations of an experiment on growing tomato plants using the magnetic device.

DETAILED DESCRIPTION OF THE INVENTION

Figure 1A:
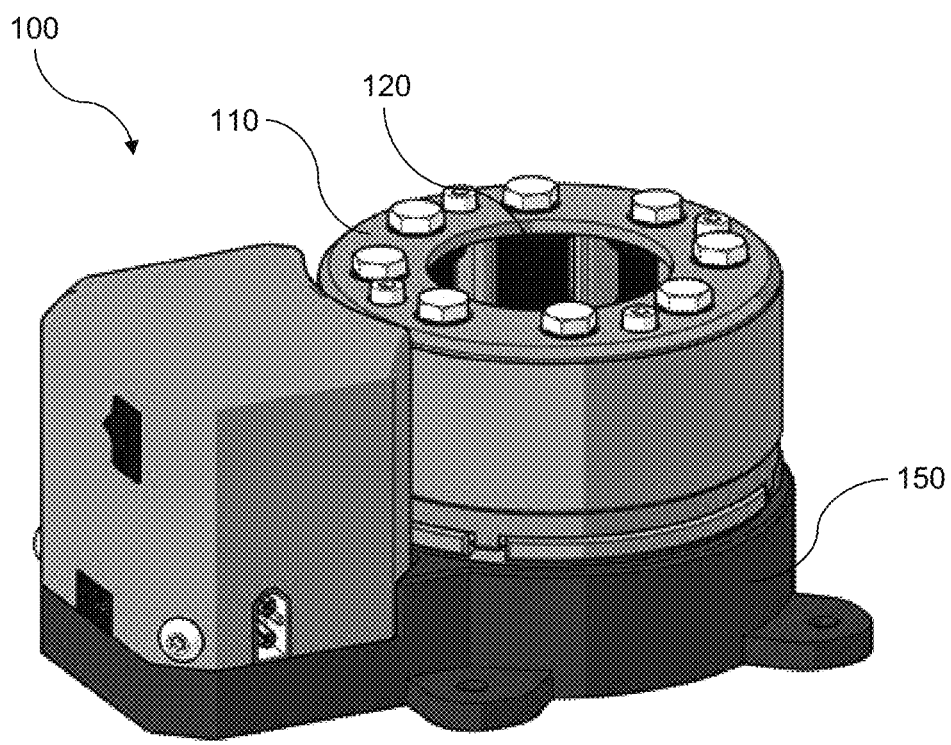
FIGS. 1A to 1D are illustrations of a magnetic device for growing plants, in accordance with embodiments of the present disclosure.

For purposes of brevity and clarity, descriptions of embodiments of the present disclosure are directed to a magnetic device and method for growing plants, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range. The terms "first", "second", etc. are used merely as labels or identifiers and are not intended to impose numerical requirements on their associated terms.

In representative or exemplary embodiments of the present disclosure, as shown in FIGS. 1A to 1D, there is a magnetic device 100 for growing plants. The magnetic device 100 includes a body 110 having a space 120 for enclosing a base of the plants and growing the plants axially out of the space 120. Notably, the plants are grown axially out of the space 120 generally along the vertical axis. For example, the body 110 has an annular structure with a central hole as the space 120 for enclosing the base of the plants. The base of the plants can include the roots and part of the plant stem or tree trunk. The plants are vascular plants of any size, including small plants like ferns and large plants like trees.

The magnetic device 100 further includes a set of magnetic elements 130 coupled to the body 110 and surrounding the space 120. The magnetic elements 130 are configured for generating an axial magnetic field in the space 120. The axial magnetic field is generated by the magnetic elements 130 which are axially magnetized. This means that the North-South axis of the magnetic elements 130 is generally parallel to the axial direction of the space 120, i.e. along the vertical axis.

Figure 1B:
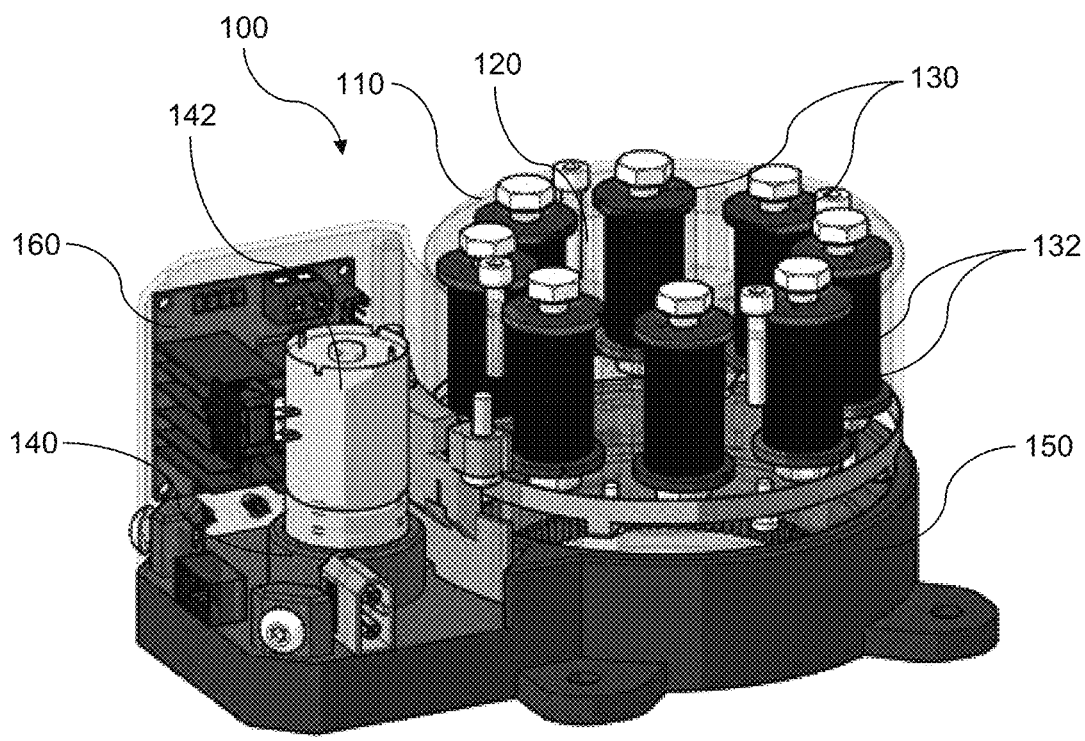

In some embodiments as shown in FIGS. 1A and 1B, the magnetic elements 130 may include a set of electromagnets. For example, the set of electromagnets includes a single electromagnet. Alternatively, a plurality of electromagnets, such as semi-circular ones, may collectively form the magnetic elements 130 surrounding the space 120. For example, each electromagnet includes an electric wire 132 wound around a magnetic core made from a ferromagnetic material such as iron. Electric current flow to the electric wires 132 may be controlled to vary the magnetic strength of the axial magnetic field. Notably, the polarities of the magnetic elements 130 can be reversed if the electric current flow changes direction.

Figure 1C:
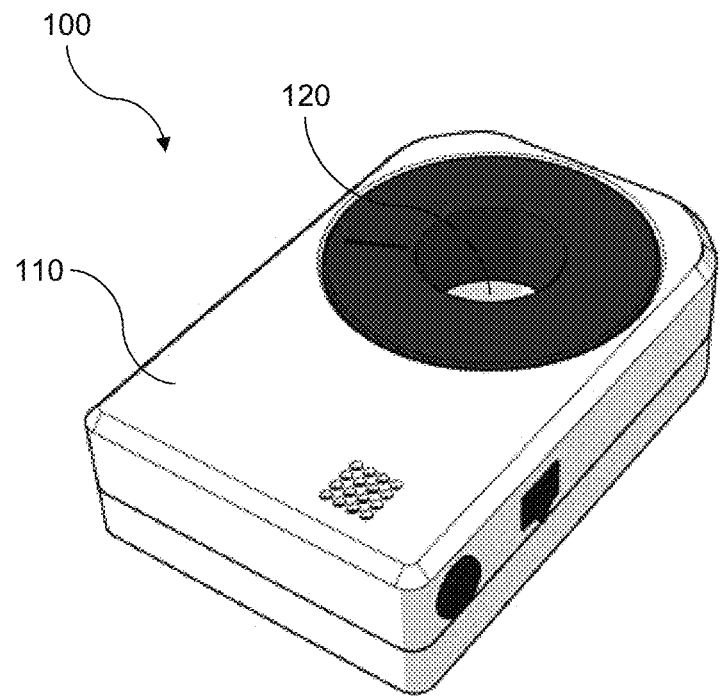
Figure 1D:
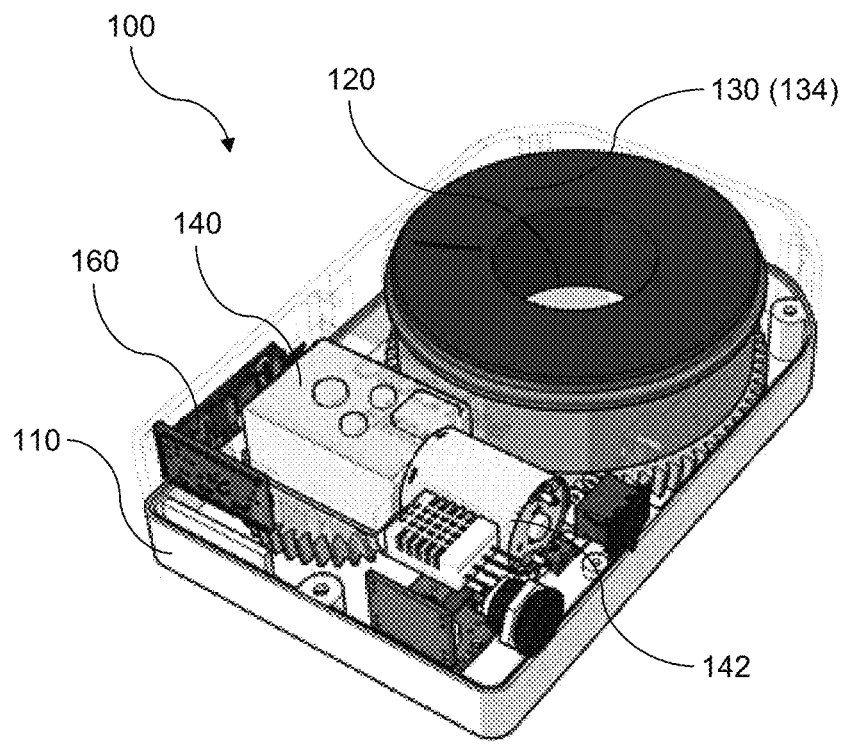

In some embodiments as shown in FIGS. 1C and 1D, the magnetic elements 130 may include a set of permanent magnets, such as neodymium magnets or samarium cobalt magnets. For example, the permanent magnets may include or form a ring magnet 134. For example, the set of permanent magnets includes a single ring magnet 134. Alternatively, a plurality of permanent magnets collectively form the ring magnet 134, such as a pair of semi-circular magnets. Notably, the ring magnet 134 has the North and South poles along the vertical axis of the ring magnet 134. For example, the South pole is facing upwards and the North pole is facing downwards.

The magnetic device 100 further includes an actuation mechanism 140 coupled to the body 110. The actuation mechanism 140 is configured for rotating the magnetic elements around the space 120, thereby rotating the axial magnetic field around the space 120. For example as shown in FIGS. 1B and 1D, the actuation mechanism 140 may include an electric motor 142, such as a DC gear motor, configured for automatically and continuously rotating the magnetic elements 130. For example, the rotational speed of the magnetic elements 130 may be one revolution every three minutes. The electric motor 142 may be controlled to vary the rotational speed of the magnetic elements 130, such as depending on the stage of plant growth. Additionally or alternatively, the actuation mechanism 140 may include a mechanically-activated mechanism for manual rotation of the magnetic elements 130, such as in absence of power or if the electric motor 142 malfunctions. For example, such mechanism can be manually activated by a biasing element (e.g. a spring) or by some form of kinetic motion.

In embodiments of the present disclosure, there is a method for growing plants. The method may be performed using various devices, including the magnetic device 100 as described herein. The method includes steps of enclosing a base of the plants within a space 120 of a device body 110, growing the plants axially out of the space 120, generating an axial magnetic field in the space by a set of magnetic elements 130 coupled to the body 110 and surrounding the space 120, rotating the magnetic elements 130 around the space 120 to thereby rotate the axial magnetic field around the space 120, and exposing the base of the plants to the rotating axial magnetic field to thereby enhance growth of the plants.

When the magnetic device 100 is in use for growing plants, the base of the plants is exposed to the rotating axial magnetic field to thereby enhance growth of the plants. As described further below, various experiments were performed on various species of plants, such as tobacco, spinach, and tomato, to show the effectiveness of the rotating axial magnetic field in enhancing plant growth.

In some embodiments such as shown in FIG. 1C, the body 110 and actuation mechanism 140 are directly coupled together or integrally formed with each other. In some embodiments such as shown in FIG. 1A, the magnetic device 100 includes a device base 150 for supporting the body 110 and actuation mechanism 140 and coupling them together. Various parts of the magnetic device 100 is preferably made of a waterproof material to shield the electronic components as the magnetic device 100 is designed to be used for plant growth wherein water irrigation is essential.

In some embodiments, the magnetic device 100 includes a control unit 160 for controlling the magnetic elements 130 and/or actuation mechanism 140. For example, the magnetic elements 130 include electromagnets and the control unit 160 can control the electric current flow to the electric wires 132 and thereby vary the magnetic strength of the axial magnetic field generated by the electromagnets. The control unit 160 can control the actuation mechanism 140, such as the electric motor 142, to vary the rotational speed of the magnetic elements 130. The control unit 160 may control the actuation mechanism 140 to rotate the magnetic elements 130 in predefined patterns, such as at a first rotational speed for a first duration and then a second rotational speed for a second duration. The magnetic strength and rotational speed can vary depending on factors such as the plant species, stage of plant growth, and ambient conditions like temperature and/or humidity. For example, the rotational speed may be reduced when the plants grow to the flowering stage, so as to reduce magnetic stresses experienced by the plants during the flowering stage and thereby optimize plant growth.

In some embodiments, the magnetic device 100 includes a set of sensors for measuring the ambient conditions of the environment in which the plants are grown. For example, the ambient conditions may include temperature and/or humidity of the environment. The sensors may be communicative with the control unit 160 to facilitate decision control of the rotation of the magnetic elements 130 based on the ambient conditions. The control unit 160 may be communicative with a remote electronic device, such as a mobile phone or computer system, for remote control of the magnetic device 100.

Various experiments were performed to investigate the effectiveness of the magnetic device 100, particularly the rotating axial magnetic field, in enhancing plant growth. These experiments were performed on tobacco plants 200, spinach plants 300, and tomato plants 400.

In the experiment on tobacco plants 200, two samples of tobacco plants 200 of similar size were selected from the same batch. The first sample 200A was grown using the magnetic device 100 as shown in FIGS. 1C and 1D with the rotating axial magnetic field from the ring magnet 134. The magnetic strength used in this experiment ranges from 6,000 to 12,000 Gauss. The second sample 200B was grown using a fixed ring magnet 134 with the same magnetic strength. The ring magnet 134 for the second sample 200B generated a static axial magnetic field. The ring magnets 134 are arranged such that the South pole is facing upwards and the North pole is facing downwards. Both samples of tobacco plants 200A,200B were grown using hydroponics for better accuracy in delivering the same amount of nutrients, thereby ensuring that the plant growth conditions are identical except for the static and rotating axial magnetic fields. The tobacco plants 200A,200B were exposed to 24 hours of continuous LED lighting per day.

Photos of the growth of the tobacco plants 200A,200B over 20 days are shown in FIGS. 2A to 2G. Additionally, sugar levels of both tobacco plants 200A,200B were measured using a brix refractometer 500 at Day 20. As shown in FIG. 2F, the tobacco plant 200A grown using the magnetic device 100 had sugar levels of 4.1% and 4.3% from two separate measurements. As shown in FIG. 2G, the tobacco plant 200B grown using the fixed ring magnet 134 had sugar levels of 3.4% and 3.9% from two separate measurements. The tobacco plant 200A had an average of 15% increase in sugar quantity compared to the tobacco plant 200B. These results indicate that the magnetic device 100 and particularly the rotating axial magnetic field has positive effects on sucrose production in tobacco plants 200.

An experiment similar to that for the tobacco plants 200 was performed for the spinach plants 300 using two samples thereof 300A,300B and also with hydroponics. The smaller-sized first sample 300A was grown using the magnetic device 100 and the larger-sized second sample 300B was grown using the fixed ring magnet 134.

Photos of the growth of the spinach plants 300A,300B over 24 days are shown in FIGS. 3A to 3J. Additionally, sugar levels of both spinach plants 300A,300B were measured using the brix refractometer 500 at Day 24. As shown in FIG. 3I, the spinach plant 300A grown using the magnetic device 100 had sugar levels of 2.8% and 3.3% from two separate measurements. As shown in FIG. 3J, the spinach plant 300B grown using the fixed ring magnet 134 had sugar levels of 1.1% and 1.2% from two separate measurements. The spinach plant 300A had an average of 65% increase in sugar quantity compared to the spinach plant 300B. Moreover, as shown in FIG. 3H, the spinach plant 300A had significantly more root mass than the spinach plant 300B, despite the spinach plant 300A being originally smaller than the spinach plant 300B. These results indicate that the magnetic device 100 and particularly the rotating axial magnetic field has positive effects on sucrose production and root mass growth in spinach plants 300.

A different experiment was performed for the tomato plants 400. Two samples of tomato plants 400 of similar size were selected from the same batch. Each sample 400A,400B contains three separate tomato plants 400. The first sample 400A was grown using the magnetic device 100 as shown in FIGS. 1C and 1D with the ring magnet 134 and rotating axial magnetic field, and the second sample 400B was grown normally without using any magnet. For the first sample 400A, the magnetic device 100 is arranged such that the South pole is facing upwards and the North pole is facing downwards, and the magnetic strength used in this experiment ranges from 6,000 to 12,000 Gauss. Both samples of tomato plants 400A,400B were grown using a soil-based system instead of hydroponics. All other conditions such as temperature and lighting are identical for both tomato plants 400A,400B. For the first 60 days, the tomato plants 400A,400B were exposed to 24 hours of continuous LED lighting per day. After day 60 which is during the fruiting stage, the tomato plants 400A,400B were exposed to 12 hours of LED lighting and 12 hours of darkness per day.

Photos of the growth of the tomato plants 400A,400B over 112 days are shown in FIGS. 4A to 4Q. Both tomato plants 400A,400B were growing healthily after 1 month. At Day 33, flowers can be seen on the tomato plant 400A but not yet for the tomato plant 400B until around two weeks later. At Day 60, the tomato plant 400A has started fruiting and the tomato plant 400A is healthy and strong. Comparatively, at Day 60, although the tomato plant 400B has flowered, it has not started fruiting yet. The tomato plant 400B is also weaker and its growth has stunted, possibly because it is less resistant to temperature variations as the tomato plants 400A,400B were grown in temperatures colder than what the tomato species tends to thrive in. At Day 60, fungi also started attacking the tomato plants 400A,400B and by Day 70, mould was found to be growing on both tomato plants 400A,400B due to high humidity in the environment. However, the tomato plant 400A showed greater resistance to the fungi attack than the tomato plant 400B. The tomato plant 400A had also fruited but the tomato plant 400B has not fruited yet. At Day 92, the tomato plant 400A had around 10-15 tomato fruits that were ripe and red. About one-third had ripened and were ready for consumption. The tomato plant 400B had not flowered or fruited and it had lost about 60% of its mass. At Day 112 which is the last day of the experiment, the tomato plant 400B still had not fruited yet.

Additionally, sugar levels of both tomato plants 400A, 400B were measured using the brix refractometer 500 at Day 112. As shown in FIG. 4P, the tomato plant 400A grown using the magnetic device 100 had a sugar level of 6.0%. As shown in FIG. 4Q, the tomato plant 400B grown normally without using any magnet had a sugar level of 3.5%. The tomato plant 400A had about 70% increase in sugar quantity compared to the tomato plant 400B. Moreover, as shown in FIG. 4O, the roots of the tomato plant 400A were healthier looking and had more root mass than the roots of the tomato plant 400B. These results indicate that the magnetic device 100 and particularly the rotating axial magnetic field has positive effects on sucrose production and root mass growth in tomato plants 400.

The results from these experiments showed that when the plants are grown within the space 120 of the magnetic device 100 and the base of the plants is exposed to the rotating axial magnetic field, the plant growth is enhanced and the rotating axial magnetic field achieves superior results on the plant growth, particularly increased sucrose production and larger root mass. There is also improved weather resistance, such as to temperature variations, and greater resistance to attacks by fungi. Although these experiments were performed on selected plant species including the tobacco plants 200, spinach plants 300, and tomato plants 400, it will be appreciated that the rotating axial magnetic field can achieve similar benefits for other species of plants grown using the magnetic device 100. Moreover, in addition to plants that produce edible crops or food for people, the magnetic device 100 can be used for other types of plants such as those with medicinal benefits, such as *cannabis*.

The magnetic device 100 is thus able to enhance plant growth by aligning the magnetic field along the axial direction that is generally parallel to the stem axis of the plants. The base of the plants is exposed to the axial magnetic field that is continuously rotating to evenly distribute the axial magnetic field around the plants. The magnetic device 100 is also attached to each individual plant, giving more attention to the plant and targeted exposure to the magnetic field. The rate of plant growth can be accelerated so that the plants grow to maturity more quickly, and the size of the adult plants can also be increased. The magnetic device 100 provides a cost effective and efficient way to enhance plant growth and hence increase the yield of plants, particularly agricultural crops for food production. Due to better nutrient and water absorption when the magnetic device 100 is used, there is less nutrient wastage and the amount of fertilizers used can be reduced. The rotating axial magnetic field also improves resistance to weather and fungi and has a repulsive effect on some insects.

The axial alignment of the magnetic field enables both the plants and the soil under the plants to be magnetized, which in turn stimulates root growth. The arrangement of the magnetic poles may depend on the species of plants grown using the magnetic device 100. For example for aboveground plants or crops, the South pole faces upwards to magnetize the crops and the North pole faces downwards to magnetize the soil. For underground plants or crops, the polarity arrangement may reverse.

Multiple magnetic devices 100 can be used in a greenhouse for enhancing growth of a large batch of plants of various species. The magnetic devices 100 have long lifespans and can be used for many harvests. Due to the better absorption of nutrients and repulsive effect on pests, the amount of fertilizers and pesticides used in each harvest can be reduced, thus helping the greenhouse to lower costs while improving plant yield and quality. Use of the magnetic devices 100 thus provides a commercially viable way to increase agricultural crop yield to address future food demand.

In the foregoing detailed description, embodiments of the present disclosure in relation to a magnetic device and method for growing plants are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A magnetic device for growing plants, the magnetic device comprising:
    a body having a space adapted to enclose a base of the plants and to allow the plants to grow axially out of the space along a vertical axis;
    a set of magnetic elements coupled to said body and surrounding the space about the vertical axis, said set of magnetic elements configured to generate an axial magnetic field in the space; and
    an actuation mechanism coupled to said body and configured to rotate said set of magnetic elements around the space and about the vertical axis, thereby rotating the axial magnetic field around the space and about the vertical axis,
    wherein in use, the base of the plants is surrounded by said set of magnet elements and exposed to the rotating axial magnetic field a set of sensors configured to measure ambient conditions of an environment in which plants are grown.

2. The magnetic device of claim 1, wherein said set of magnetic elements comprise a set of permanent magnets.

3. The magnetic device of claim 2, wherein the set of permanent magnets comprise a ring magnet.

4. The magnetic device of claim 1, wherein said set of magnetic elements comprise a set of electromagnets.

5. The magnetic device of claim 1, wherein said actuation mechanism comprises an electric motor.

6. The magnetic device of claim 1, wherein said actuation mechanism comprises a mechanically-activated mechanism.

7. The magnetic device of claim 1, further comprising:
    a control unit cooperative with said set of magnetic elements and adapted to control at least one magnetic element of said set of magnetic elements and the actuation mechanism.

8. The magnetic device of claim 7, wherein said control unit is cooperative with said actuation mechanism so as to vary a rotational speed of the at least one magnetic element of said set of magnetic elements.

9. The magnetic device of claim 7, wherein said control unit is cooperative with said set of the magnetic elements so as to vary magnetic strength of the axial magnetic field.

10. The magnetic device of claim 7, wherein said control unit is communicative with a remote electronic device and adapted to remotely control of the magnetic device.

11. The magnetic device of claim 1, wherein the ambient conditions comprise at least one of temperature and humidity.

12. A method for growing plants, the method comprising:
    enclosing a base of the plants within a space of a device body;
    growing the plants axially out of the space along a vertical axis;
    generating an axial magnetic field in the space along the vertical axis by a set of magnetic elements coupled to the device body, the set of magnetic elements surrounding the space about the vertical and surrounding the base of the plants;
    rotating the set of magnetic elements around the space and about the vertical axis by an actuation mechanism coupled to the device body to thereby rotate the axial magnetic field around the space and about the vertical axis; and
    exposing the base of the plants to the rotating axial magnetic field to thereby enhance growth of the plants.

13. The method of claim 12, further comprising:
    controlling at least one magnetic element of the set of magnetic elements and the actuation mechanism using a control unit.

14. The method of claim 13, further comprising:
controlling the actuation mechanism to vary a rotational speed of the set of magnetic elements by using the control unit.

15. The method of claim 13, further comprising:
controlling the set of magnetic elements to vary a magnetic strength of the axial magnetic field by using the control unit.

16. The method of claim 12, further comprising: communicating with a remote electronic device.

17. The method of claim 12, further comprising:
measuring ambient conditions of an environment in which the plants are grown.

18. The method of claim 17, wherein the ambient conditions comprise at least one of temperature and humidity.

19. The method of claim 12, wherein the set of magnetic elements comprise at least one of a set of permanent magnets and a set of electromagnets.

\* \* \* \* \*